(12) United States Patent
Wilson et al.

(10) Patent No.: US 10,269,084 B2
(45) Date of Patent: Apr. 23, 2019

(54) REGISTRY

(71) Applicant: YDF GLOBAL PTY LTD, Queensland (AU)

(72) Inventors: Jamie Robert Wilson, Queensland (AU); Craig Steven Wright, New South Wales (AU)

(73) Assignee: YDF GLOBAL PTY LTD, Queensland (AU)

( * ) Notice: Subject to any disclaimer, the term of this patent is extended or adjusted under 35 U.S.C. 154(b) by 0 days.

(21) Appl. No.: 15/683,354

(22) Filed: Aug. 22, 2017

(65) Prior Publication Data

US 2018/0025455 A1 Jan. 25, 2018

Related U.S. Application Data

(63) Continuation of application No. 14/354,359, filed as application No. PCT/AU2012/001304 on Oct. 25, 2012, now Pat. No. 9,811,869.

(30) Foreign Application Priority Data

Oct. 28, 2011 (AU) ............................... 2011904507
Jun. 18, 2012 (AU) ............................... 2012902540
(Continued)

(51) Int. Cl.
*H04L 29/06* (2006.01)
*G06Q 50/18* (2012.01)
(Continued)

(52) U.S. Cl.
CPC ........... *G06Q 50/186* (2013.01); *G06Q 10/10* (2013.01); *G06Q 50/265* (2013.01); *H04L 63/0428* (2013.01); *H04L 63/10* (2013.01)

(58) Field of Classification Search
CPC ....... H04L 63/10; H04W 12/08; G06F 21/554
(Continued)

(56) References Cited

U.S. PATENT DOCUMENTS 4,879,747 A 11/1989 Leighton et al.
5,436,972 A 7/1995 Fischer
(Continued)

OTHER PUBLICATIONS

Shamir et al., "How to share a secret", ip.com Journal, ip.com Inc., West Henrietta, NY, US, Mar. 30, 2007 (Mar. 30, 2007), XP01 31 1 9902, ISSN: 1533-0001 (original publication date: Apr. 30, 1979).
(Continued)

*Primary Examiner* — Lynn D Feild
*Assistant Examiner* — Viral S Lakhia
(74) *Attorney, Agent, or Firm* — Morgan, Lewis & Bockius LLP

(57) ABSTRACT

A system, method, server processing system, and computer program product for operating a registry. In one aspect, the server processing system is configured to: receive, from a user processing system in data communication with the server processing system, document data relating to an entity; receive, from the user processing system, access data indicative of an accessing party to be provided access to the document data if a defined trigger event occurs; store, in a data store associated with the server processing system, a registry for the entity indicative of the document data and the access data; determine that a defined trigger event has occurred; and in response to determining that that a defined trigger event has occurred, provide the accessing party read-only access to the document data via an access processing system in data communication with the server processing system.

13 Claims, 15 Drawing Sheets

(30) Foreign Application Priority Data

Jun. 18, 2012 (AU) .............................. 2012902548
Jun. 18, 2012 (AU) .............................. 2012902549

(51) Int. Cl.
*G06Q 10/10* (2012.01)
*G06Q 50/26* (2012.01)

(58) Field of Classification Search
USPC .................................. 713/150–155; 726/5–7
See application file for complete search history.

(56) References Cited

U.S. PATENT DOCUMENTS

| | | | |
|---|---|---|---|
| 5,465,299 A | 11/1995 | Matsumoto et al. | |
| 5,901,227 A | 5/1999 | Perlman | |
| 6,118,874 A | 9/2000 | Okamoto et al. | |
| 6,430,542 B1 | 8/2002 | Moran | |
| 6,477,254 B1 | 11/2002 | Miyazaki et al. | |
| 6,970,836 B1 | 11/2005 | Paltenghe et al. | |
| 7,146,009 B2 | 12/2006 | Andivahis et al. | |
| 7,269,261 B1 | 9/2007 | Jennings | |
| 7,533,045 B1* | 5/2009 | Lange | G06Q 40/00 705/35 |
| 8,316,237 B1 | 11/2012 | Felsher et al. | |
| 8,364,967 B2 | 1/2013 | Sudia et al. | |
| 8,600,851 B1* | 12/2013 | Pacheco | G06Q 40/06 705/35 |
| 8,930,253 B1* | 1/2015 | Ball | G06Q 40/00 705/35 |
| 2002/0111946 A1* | 8/2002 | Fallon | G06Q 10/10 |
| 2003/0038775 A1* | 2/2003 | Waller | G06F 17/30876 345/156 |
| 2003/0130867 A1 | 7/2003 | Coelho et al. | |
| 2003/0182290 A1* | 9/2003 | Parker | G06Q 40/02 |
| 2003/0217120 A1* | 11/2003 | Hickey | H04L 29/06 709/219 |
| 2004/0064391 A1* | 4/2004 | Lange | G06Q 40/02 705/36 R |
| 2004/0139344 A1 | 7/2004 | Maurer | |
| 2005/0027544 A1* | 2/2005 | Newstead | G06Q 10/10 705/301 |
| 2006/0184641 A1* | 8/2006 | Moetteli | G06Q 50/10 709/217 |
| 2007/0192114 A1* | 8/2007 | Parpala | G06Q 50/18 705/312 |
| 2007/0214365 A1 | 9/2007 | Cornett et al. | |
| 2007/0220257 A1 | 9/2007 | Mardiks et al. | |
| 2008/0031460 A1 | 2/2008 | Brookner et al. | |
| 2008/0222040 A1 | 9/2008 | Halsted et al. | |
| 2009/0265755 A1* | 10/2009 | Hamilton, II | H04L 63/0227 726/1 |
| 2009/0323958 A1* | 12/2009 | Schneider | H04L 9/085 380/277 |
| 2010/0150352 A1 | 6/2010 | Mansour et al. | |
| 2010/0185871 A1* | 7/2010 | Scherrer | G06F 21/6218 713/186 |
| 2010/0217987 A1* | 8/2010 | Shevade | G06F 21/6272 713/175 |
| 2010/0257088 A1* | 10/2010 | Grant Williams | G06Q 10/10 705/37 |
| 2011/0145593 A1 | 6/2011 | Auradkar et al. | |
| 2012/0131351 A1* | 5/2012 | Balinsky | H04L 9/0825 713/189 |
| 2012/0163590 A1 | 6/2012 | Lieber et al. | |
| 2012/0221944 A1* | 8/2012 | Bloomfield | G06Q 10/10 715/255 |
| 2012/0233080 A1* | 9/2012 | Triola | G06Q 20/10 705/316 |
| 2012/0254045 A1 | 10/2012 | Orfano | |
| 2013/0238893 A1* | 9/2013 | Henderson | H04L 63/10 713/155 |

OTHER PUBLICATIONS

Australian Patent Application No. 2014259536, Patent Examination Report 1, dated Oct. 22, 2015, 3 pages.
European Patent Application No. 12842702.8, Extended European Search Report, dated Jun. 15, 2015, 5 pages.
International Patent Application No. PCT/AU2012/001304, Notification Concerning Transmittal of International Preliminary Report on Patentability, dated May 8, 2014, 7 pages.

* cited by examiner

REGISTRY

CROSS REFERENCE TO RELATED APPLICATIONS

This application is a continuation of U.S. patent application Ser. No. 14/354,359 filed on Apr. 25, 2014, entitled "REGISTRY" which is a 371 National Stage of International Patent Application No. PCT/AU2012/001304 filed on Oct. 25, 2012, which claims priority to Australian Patent Application No. 20011904507 filed Oct. 28, 2011, Australian Patent Application No. 2012902540 filed June 18, 2012, Australian Patent Application No. 2012902548 filed Jun. 18, 2012 and Australian Patent Application No. 2012902549 filed Jun. 18, 2012 all of which are incorporated herein by reference in their entireties.

TECHNICAL FIELD

The present invention relates to a registry, and particularly a registry suitable for use as an estate registry, a corporate registry or a document registry.

BACKGROUND

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

When a person dies or has a life event that precludes them from managing their own affairs (e.g. head trauma), an executor has the unfortunate task of gathering documentation and information to handle the affairs of the deceased. Most people store documentation in a number of disparate locations which can make the task of handling affairs for the deceased extremely frustrating for the executor at an emotionally difficult time. In some instances, it may not even be possible to locate particular information which causes further frustration.

One potential solution is the use of a traditional steel safe which safely stores therein the documentation needed to handle the person's affairs in the event of death. However, safes also suffer drawbacks. Firstly, another person must be able to access the contents of the safe after the person dies, otherwise the documentation cannot be accessed. Due to this necessity, there is a serious security issue, in particular that another person has access to a central source of information which can be used for identity fraud. Additionally, there is a heavy burden for the contents of the safe to be current and accurate. However, the task of ensuring that the contents of the safe is current can be tedious. Whilst it is possible that another person can be given the task of keeping the documentation up to date, this again raises the same security issue above. Furthermore, it may be the wishes of the person to whom the documentation relates that a trusted party only have access to a portion of the documents which is not generally possible with a safe. Finally, it is desirable to ensure that contents of the safe are not altered without authorisation by the person to whom the documentation relates, i.e. the trusted party should only have read-only access. However, this is generally difficult to ensure with paper-based documents stored in a traditional safe.

Similar circumstances may arise when a corporation or other entity enters into liquidation (or some other defined and agreed event occurs), in which case a liquidator will need to gain access to documentation relating to the corporation to allow the liquidation process to proceed. Corporate entities may require the storage of large quantities of documentation of a number of different types, which can greatly complicate the task of the liquidator.

Entities may be accused of altering or deleting key documents in the event of a liquidation (or otherwise defined) event. In securely holding a read only escrowed version of the data, no valid accusations of alteration following the event, no valid accusations by directors and otherwise interested parties to modification and similar can be made.

Moreover, third parties may be excluded from access to documents that they have contractual rights to when a liquidation event occurs. Software source code can be protected from general access for example, but contract escrow can be provided to end users of the software if, for example, a firm was to enter into a liquidation event. This allows the originating company to secure access to their source code and/or other key documents and data whilst also offering a level of protection to the entities clients or other contracted parties.

Again, traditional physical document storage solutions, such as the use of a safe, suffer significant drawbacks when used to store documentation relating to a corporate entity. Along with the drawbacks already discussed above, it is not generally possible to ensure that another person that is able to access the contents of a safe is unable to alter the contents, and worse, it is not generally possible to determine if contents have been removed from the safe.

There is therefore a need to overcome or at least alleviate one or more of the above mentioned disadvantages or to provide a commercial alternative.

SUMMARY

In a first broad form the present invention seeks to provide a server processing system for operating a registry, wherein the server processing system is configured to:

receive, from a user processing system in data communication with the server processing system, document data relating to an entity;

receive, from the user processing system, access data indicative of an accessing party to be provided access to the document data if a defined trigger event occurs;

store, in a data store associated with the server processing system, a registry for the entity indicative of the document data and the access data;

determine that a defined trigger event has occurred; and in response to determining that a defined trigger event has occurred, provide the accessing party read-only access to the document data via an access processing system in data communication with the server processing system.

The registry can be an estate registry, wherein:
the entity is an individual;
the document data is estate data indicative of estate information relating to the estate of an individual;
the access data is executor data indicative of an executor for the estate; and, a defined trigger event includes the individual dying.

Alternatively, the registry can be a corporate registry, wherein:
the entity is a corporate entity;
the document data is entity data indicative of entity information relating to the entity;

the access data is liquidator data indicative of a liquidator for the entity; and, a defined trigger event includes the entity being placed into liquidation.

Typically the server processing system is configured to:

receive, from the user processing system, authorisation data indicative of a third party authorised by the entity to read-only access at least a portion of the registry;

receive, from the third party via a third party processing system, an access request;

determine, based upon the authorisation data, if the third party is authorised to access at least a portion of the registry; and in response to identifying the third party as being authorised, provide the third party with access to at least a portion of the registry.

Typically the server processing system is configured to:

receive permission data indicative of the entity authorising the third party being able to access a portion of the registry;

store the permission data in the data store; and in response to receiving the access request and upon identifying the third party as being authorised, provide the third party with read-only access to the portion of the registry corresponding to the permission data for the third party.

Typically the server processing system is configured to:

maintain read only access to documents stored in the registry;

maintain a secure timestamp of all documents stored in the registry; and, allow documents stored in the registry to be digitally signed;

Typically the access request includes one or more identity fields and the data store has stored therein identity data for the entity associated with the registry, wherein the server processing system is configured to compare the one or more identity fields to the identity data to uniquely identify the registry associated with the entity.

Typically the server processing system is configured to monitor electronic announcements to determine if a defined trigger event has occurred.

Typically the server processing system is configured to:

receive, from a notifying party, a notification indicative that a defined trigger event has occurred; and in response to receiving the notification, provide the accessing party read-only access to the document data.

Typically the server processing system is configured to:

receive, from the entity via the user processing system, an indication of an authorised notifying party;

store, in the data store, the indication of the authorized notifying party;

receive, from a notifying party, an indication that a defined trigger event has occurred;

determine if the notifying party is the authorised notifying party; and in response to the notifying party corresponding to the authorised notifying party, provide the accessing party read-only access to the document data.

Typically the data store has stored therein one or more reminder rules, wherein the server processing system is configured to:

automatically execute the one or more reminder rules to determine if a reminder notice is required to be sent to the entity to remind the entity to review and update the registry; and in the event of a positive determination, transfer, to the entity, the reminder notice.

Typically the server processing system is configured to encrypt the document data when stored in the registry.

In a second broad form the present invention seeks to provide a method for operating a registry, wherein the method includes, in a server processing system:

receiving, from a user processing system in data communication with the server processing system, document data relating to the entity;

receiving, from the user processing system, access data indicative of an accessing party to be provided access to the document data if a defined trigger event occurs;

storing, in a data store associated with the server processing system, a registry for the entity indicative of the document data and the access data;

determining that a defined trigger event has occurred; and in response to determining that a defined trigger event has occurred, providing the accessing party read-only access to the document data via an access processing system in data communication with the server processing system.

The registry can be an estate registry, wherein:

the entity is an individual;

the document data is estate data indicative of estate information relating to the estate of an individual;

the access data is executor data indicative of an executor for the estate; and, a defined trigger event includes the individual dying.

Alternatively the registry can be a corporate registry, wherein:

the entity is a corporate entity;

the document data is entity data indicative of entity information relating to the entity;

the access data is liquidator data indicative of a liquidator for the entity; and, a defined trigger event includes the entity being placed into liquidation.

Typically the method includes, in the server processing system:

receiving, from the user processing system, authorisation data indicative of a third party authorised by the entity to access at least a portion of the registry;

receiving, from the third party via a third party processing system, an access request;

determining, based upon the authorisation data, if the third party is authorised to read-only access at least a portion of the registry; and in response to identifying the third party as being authorised, providing the third party with access to at least a portion of the registry.

Typically the method includes, in the server processing system:

receiving permission data indicative of the entity authorising the third party being able to access a portion of the registry;

storing the permission data in the data store; and in response to receiving the access request and upon identifying the third party as being authorised, providing the third party with read-only access to the portion of the registry corresponding to the permission data for the third party.

Typically the access request includes one or more identity fields and the data store has stored therein identity data for the entity associated with the registry, wherein the method includes the server processing system comparing the one or more identity fields to the identity data to uniquely identify the registry associated with the entity.

Typically the method includes the server processing system monitoring electronic announcements to determine if a defined trigger event has occurred.

Typically the method includes, in the server processing system:
  receiving, from a notifying party, a notification indicative that a defined trigger event has occurred; and
  in response to the party receiving the notification, providing the accessing party read-only access to the document data.

Typically the method includes the server processing system:
  receiving, from the entity via the user processing system, an indication of an authorised notifying party;
  storing, in the data store, the indication of the authorised notifying party;
  receiving, from a notifying party, an indication that a defined trigger event has occurred;
  determining if the notifying party is the authorised notifying party; and
  in response to the notifying party corresponding to the authorised notifying party, providing the accessing party read-only access to the document data.

Typically the data store has stored therein one or more reminder rules, wherein the method includes, in the server processing system:
  automatically executing the one or more reminder rules to determine if a reminder notice is required to be sent to the entity to remind the entity to review and update the registry; and
  in the event of a positive determination, transferring, to the entity, the reminder notice.

Typically the method includes the server processing system encrypting the document data when stored in the registry.

In a third broad form the present invention seeks to provide a computer program product for configuring a server processing system for operating a registry, wherein the computer program product includes executable instructions which configures the server processing system to:
  receive, from a user processing system in data communication with the server processing system, document data relating to the entity;
  receive, from the user processing system, access data indicative of an accessing party to be provided access to the document data if a defined trigger event occurs;
  store, in a data store associated with the server processing system, a registry for the entity indicative of the document data and the access data;
  determine that a defined trigger event has occurred; and
  in response to determining that the defined trigger event has occurred, provide the liquidator read-only access to the document data via an access processing system in data communication with the server processing system.

The registry can be an estate registry, wherein:
  the entity is an individual;
  the document data is estate data indicative of estate information relating to the estate of an individual;
  the access data is executor data indicative of an executor for the estate; and,
  a defined trigger event includes the individual dying.

Alternatively, the registry can be a corporate registry, wherein:
  the entity is a corporate entity;
  the document data is entity data indicative of entity information relating to the entity;
  the access data is liquidator data indicative of a liquidator for the entity; and,
  a defined trigger event includes the entity being placed into liquidation.

Typically the computer program product configures the server processing system to:
  receive, from the user processing system, authorisation data indicative of a third party authorised by the entity to access at least a portion of the registry;
  receive, from the third party via a third party processing system, an access request;
  determine, based upon the authorisation data, if the third party is authorised to access at least a portion of the registry; and
  in response to identifying the third party as being authorised, provide the third party with read-only access to at least a portion of the registry.

Typically the computer program product configures the server processing system to:
  receive permission data indicative of the entity authorising the third party being able to access a portion of the registry;
  store the permission data in the data store; and
  in response to receiving the access request and upon identifying the third party as being authorised, provide the third party with read-only access to the portion of the registry corresponding to the permission data for the third party.

Typically the access request includes one or more identity fields and the data store has stored therein identity data for the entity associated with the registry, wherein the computer program product configures the server processing system to compare the one or more identity fields to the identity data to uniquely identify the registry associated with the entity.

Typically the computer program product configures the server processing system to monitor electronic announcements to determine if the entity has been placed into liquidation or suffered a defined trigger event.

Typically the computer program product configures the server processing system to:
  receive, from a notifying party, a notification indicative that a defined trigger event has occurred; and
  in response to receiving the notification, provide the accessing party read-only access to the document data.

Typically the computer program product configures the server processing system to:
  receive, from the entity via the user processing system, an indication of an authorised notifying party;
  store, in the data store, the indication of the authorised notifying party;
  receive, from a notifying party, an indication that a defined trigger event has occurred;
  determine if the notifying party is the authorised notifying party; and
  in response to the notifying party corresponding to the authorised notifying party, provide the accessing party read-only access to the document data.

Typically the data store has stored therein one or more reminder rules, wherein the computer program product configures the server processing system to:
  automatically execute the one or more reminder rules to determine if a reminder notice is required to be sent to the entity to remind the entity to review and update the registry; and
  in the event of a positive determination, transfer, to the entity, the reminder notice.

Typically the computer program product configures the server processing system to encrypt the document data when stored in the registry.

In a fourth broad form the present invention seeks to provide a server processing system for operating a registry, wherein the server processing system is configured to:

receive, from a user processing system in data communication with the server processing system, estate data indicative of estate information relating to the estate of an individual;

receive, from the user processing system, executor data indicative of an executor for the estate;

store, in a data store associated with the server processing system, a registry for the individual indicative of the estate data and the executor data;

determine that the individual has died or suffered a defined trigger event; and in response to determining that the individual has died or suffered a defined trigger event, provide the executor read-only access to the estate data via an executor processing system in data communication with the server processing system.

Typically the server processing system is configured to monitor electronic death announcements to determine if the individual has died or suffered a defined trigger event.

Typically the server processing system is configured to:

receive, from a notifying party, a notification indicative that the individual has died or suffered a defined trigger event; and in response to receiving the notification, provide the executor read-only access to the estate data.

Typically the server processing system is configured to:

receive, from the individual via the user processing system, an indication of an authorised death notifying party;

store, in the data store, the indication of the authorised death notifying party;

receive, from a death notifying party, an indication that the individual has died;

determine if the death notifying party is the authorised death notifying party; and in response to the death notifying party corresponding to the authorised death notifying party, provide the executor read-only access to the estate data.

Typically the estate data is indicative of at least one of:
a will;
a deed;
a business document;
a personal document;
share information;
a funeral plan;
an insurance policy; and
superannuation information.

In a fifth broad form the present invention seeks to provide a method for operating a registry, wherein the method includes, in a server processing system:

receiving, from a user processing system in data communication with the server processing system, estate data indicative of estate information relating to the estate of the individual;

receiving, from the user processing system, executor data indicative of an executor for the estate;

storing, in a data store associated with the server processing system, a registry for the individual indicative of the estate data and the executor data;

determining that the individual has died or suffered a defined trigger event; and in response to determining that the individual has died or suffered a defined trigger event, providing the executor read-only access to the estate data via an executor processing system in data communication with the server processing system.

Typically the method includes the server processing system monitoring electronic death announcements to determine if the individual has died or suffered a defined trigger event.

Typically the method includes, in the server processing system:

receiving, from a death notifying party, a death notification indicative that the individual has died or suffered a defined trigger event; and in response to the party receiving the death notification, providing the executor read-only access to the estate data.

Typically the method includes the server processing system:

receiving, from the individual via the user processing system, an indication of an authorised death notifying party;

storing, in the data store, the indication of the authorised death notifying party;

receiving, from a death notifying party, an indication that the individual has died or suffered a defined trigger event;

determining if the death notifying party is the authorised death notifying party; and in response to the death notifying party corresponding to the authorised death notifying party, providing the executor read-only access to the estate data.

Typically the estate data is indicative of at least one of:
a will;
a deed;
a business document;
a personal document;
share information;
a funeral plan;
an insurance policy; and
superannuation information.

In a sixth broad form the present invention seeks to provide a computer program product for configuring a server processing system for operating a registry, wherein the computer program product includes executable instructions which configures the server processing system to:

receive, from a user processing system in data communication with the server processing system, estate data indicative of estate information relating to the estate of the individual;

receive, from the user processing system, executor data indicative of an executor for the estate;

store, in a data store associated with the server processing system, a registry for the individual indicative of the estate data and the executor data;

determine that the individual has died or suffered a defined trigger event; and in response to determining that the individual has died or suffered a defined trigger event, provide the executor read-only access to the estate data via an executor processing system in data communication with the server processing system.

Typically the computer program product configures the server processing system to monitor electronic death announcements to determine if the individual has died or suffered a defined trigger event.

Typically the computer program product configures the server processing system to:

receive, from a death notifying party, a death notification indicative that the individual has died or suffered a defined trigger event; and in response to the party receiving the death notification, provide the executor read-only access to the estate data.

Typically the computer program product configures the server processing system to:

receive, from the individual via the user processing system, an indication of an authorised death notifying party;

store, in the data store, the indication of the authorised death notifying party;

receive, from a death notifying party, an indication that the individual has died or suffered a defined trigger event;

determine if the death notifying party is the authorised death notifying party; and in response to the death notifying party corresponding to the authorised death notifying party, provide the executor read-only access to the estate data.

Typically the data store has stored therein one or more reminder rules, wherein the computer program product configures the server processing system to:

automatically execute the one or more reminder rules to determine if a reminder notice is required to be sent to the individual to remind the individual to review and update the registry; and in the event of a positive determination, transfer, to the individual, the reminder notice.

Typically the estate data is indicative of at least one of:
a will;
a deed;
a business document;
a personal document;
share information;
a funeral plan;
an insurance policy; and
superannuation information.

In a seventh broad form the present invention seeks to provide a server processing system for operating a registry, wherein the server processing system is configured to:

receive, from a user processing system in data communication with the server processing system, entity data indicative of entity information relating to an entity;

receive, from the user processing system, liquidator data indicative of a liquidator for the entity;

store, in a data store associated with the server processing system, a registry for the entity indicative of the entity data and the liquidator data;

determine that the entity has been placed into liquidation or suffered a defined trigger event; and in response to determining that the entity has been placed into liquidation or suffered a defined trigger event, provide the liquidator read-only access to the entity data via the liquidator processing system in data communication with the server processing system.

Typically the server processing system is configured to monitor electronic announcements to determine if the entity has been placed into liquidation or suffered a defined trigger event.

Typically the server processing system is configured to:

receive, from a notifying party, a notification indicative that the entity has been placed into liquidation or suffered a defined trigger event; and in response to receiving the notification, provide the liquidator read-only access to the entity data.

Typically the server processing system is configured to:

receive, from the entity via the user processing system, an indication of an authorised notifying party;

store, in the data store, the indication of the authorised notifying party;

receive, from a notifying party, an indication that the entity has been placed into liquidation or suffered a defined trigger event;

determine if the notifying party is the authorised notifying party; and in response to the notifying party corresponding to the authorised notifying party, provide the liquidator read-only access to the entity data.

Typically the entity data is indicative of at least one of:
contracts;
software source code;
a business document;
share information;
research data; and
superannuation information.

In an eighth broad form the present invention seeks to provide a method for operating a registry, wherein the method includes, in a server processing system:

receiving, from a user processing system in data communication with the server processing system, entity data indicative of entity information relating to the entity data;

receiving, from the user processing system, liquidator data indicative of the liquidator for the entity;

storing, in a data store associated with the server processing system, a registry for the entity indicative of the entity data and the liquidator data;

determining that the entity has been placed into liquidation or suffered a defined trigger event; and in response to determining that the entity has been placed into liquidation or suffered a defined trigger event, providing the liquidator read-only access to the entity data via the liquidator processing system in data communication with the server processing system.

Typically the method includes the server processing system monitoring electronic announcements to determine if the entity has been placed' into liquidation or suffered a defined trigger event.

Typically the method includes, in the server processing system:

receiving, from a notifying party, a notification indicative that the entity has been placed into liquidation or suffered a defined trigger event; and in response to the party receiving the notification, providing the liquidator read-only access to the entity data.

Typically the method includes the server processing system:

receiving, from the entity via the user processing system, an indication of an authorised notifying party;

storing, in the data store, the indication of the authorised notifying party;

receiving, from a notifying party, an indication that the entity has been placed into liquidation or suffered a defined trigger event;

determining if the notifying party is the authorised notifying party; and in response to the notifying party corresponding to the authorised notifying party, providing the liquidator read-only access to the entity data.

Typically the entity data is indicative of at least one of:
contracts;
software source code;
a business document;
share information;
research data; and
superannuation information.

In a ninth broad form the present invention seeks to provide a computer program product for configuring a server processing system for operating a registry, wherein the computer program product includes executable instructions which configures the server processing system to:

receive, from a user processing system in data communication with the server processing system, entity data indicative of entity information relating to the entity data;

receive, from the user processing system, liquidator data indicative of the liquidator for the entity;

store, in a data store associated with the server processing system, a registry for the entity indicative of the entity data and the liquidator data;

determine that the entity has been placed into liquidation or suffered a defined trigger event; and in response to determining that the entity has been placed into liquidation or suffered a defined trigger event, provide the liquidator read-only access to the entity data via the liquidator processing system in data communication with the server processing system.

Typically the computer program product configures the server processing system to monitor electronic announcements to determine if the entity has been placed into liquidation or suffered a defined trigger event.

Typically the computer program product configures the server processing system to:

receive, from a notifying party, a notification indicative that the entity has been placed into liquidation or suffered a defined trigger event; and in response to the party receiving the notification, provide the liquidator read-only access to the entity data.

Typically the computer program product configures the server processing system to:

receive, from the entity via the user processing system, an indication of an authorised notifying party;

store, in the data store, the indication of the authorised notifying party;

receive, from a notifying party, an indication that the entity has been placed into liquidation or suffered a defined trigger event;

determine if the notifying party is the authorised notifying party; and in response to the notifying party corresponding to the authorised notifying party, provide the liquidator read-only access to the entity data.

Typically the entity data is indicative of at least one of:
contracts;
software source code;
a business document;
share information;
research data; and
superannuation information.

In a tenth broad form the present invention seeks to provide a method of holding a document in escrow on behalf of an individual, the method including, in a processing system:

obtaining an electronic version of the document and a digital signature of the individual, the digital signature being at least partially indicative of document content and an identity of the individual;

encrypting the document so that the document can be decrypted using a decryption key; and, storing the encrypted document in a data store, wherein the decryption key is defined by at least three key fragments, each key fragment being associated with a respective entity and the key fragments being arranged so that the decryption key can be constructed from any two key fragments thereby allowing the document to be decrypted and released from escrow using the key fragments of any two of the entities.

Typically the key fragments are stored in a store together with an indication of an identity of the respective entity.

Typically the method includes:
determining the document is to be released from escrow;
constructing the decryption key from the key fragments associated with at least two entities; and,
using the constructed decryption key to decrypt the document.

Typically the method includes:
determining at least two entities authorised to receive the document upon release; and,
releasing the document in response using the key fragments associated with the at least two entities.

Typically the method includes determining the at least two entities using document viewing permissions.

Typically the method includes:
validating an identity of at least one of the two entities using a digital signature of the entity; and,
releasing the document in response to a successful validation.

Typically the method includes:
validating the digital signature of the individual; and,
storing the encrypted document in response to a successful validation.

Typically at least one of the entities is the individual.

Typically the digital signature is generated by encrypting information using a private key of a public/private key pair and wherein the method includes:
receiving the digital signature, the digital signature being generated by encrypting information using a private key of a public/private key pair; and,
decrypting the digital signature using the public key to thereby validate the identity of at least one of the individual and one of the entities.

Typically, for the digital signature of the individual, the information is indicative of at least one of:
a date associated with the document;
an identity of the individual; and,
at least part of the document content.

Typically the at least part of the document content is determined using a hash function.

Typically the date is at least one of:
a date of creation of the document;
a date of creation of the digital signature;
a date of creation of the digital document; and,
a date of receipt of the document.

Typically the method involves encrypting, the document using a symmetrical encryption algorithm, the encryption key being the same as the decryption key.

Typically the method includes selectively releasing the document from escrow in accordance with viewing permissions.

Typically the method includes:
receiving an indication of the viewing permissions from the individual; and,
storing the viewing permissions.

Typically the viewing permissions are indicative of at least one of:
entities authorised to receive the document upon release; and,
conditions associated with release of the document to the entities.

Typically the method includes:
comparing indications of events to conditions associated with release of the document; and, providing the document to at least one of the entities in response to a successful comparison.

Typically the method includes:
generating a notification of receipt of the document; and,
providing an indication of the notification to the individual.

Typically the method includes storing the encrypted document by:
determining a document folder associated with the document; and,
storing the document in the document folder, the folder being encrypted using an encryption key associated with the decryption key.

Typically viewing permissions are associated with the folder.

Typically the method includes receiving the document from an end station via a communications network, the document being transferred via a secure connection between the end station and the processing system.

In an eleventh broad form the present invention seeks to provide a method of releasing a document held in escrow on behalf of an individual, the document being encrypted so that the document can be decrypted using a decryption key, the decryption key being defined by at least three key fragments, each key fragment being associated with a respective entity and the key fragments being arranged so that the decryption key can be constructed from any two key fragments, the method including, in a processing system:
determining the document is to be released from escrow;
constructing the decryption key from the key fragments associated with at least two of the entities; and,
using the constructed decryption key to decrypt and thereby release the document.

Typically the key fragments are stored in a store together with an indication of an identity of the respective entity, and wherein the method includes retrieving key fragments from the store.

Typically the method includes:
determining at least two entities authorised to receive the document upon release; and,
releasing the document in response using the key fragments associated with the at least two entities.

Typically the method includes determining the at least two entities using document viewing permissions.

Typically the method includes:
validating an identity of at least one of the two entities using a digital signature of the entity; and,
releasing the document in response to a successful validation.

PREFERRED EMBODIMENTS

The following modes, given by way of example only, are described in order to provide a more precise understanding of the subject matter of a preferred embodiment or embodiments.

Figure 1:
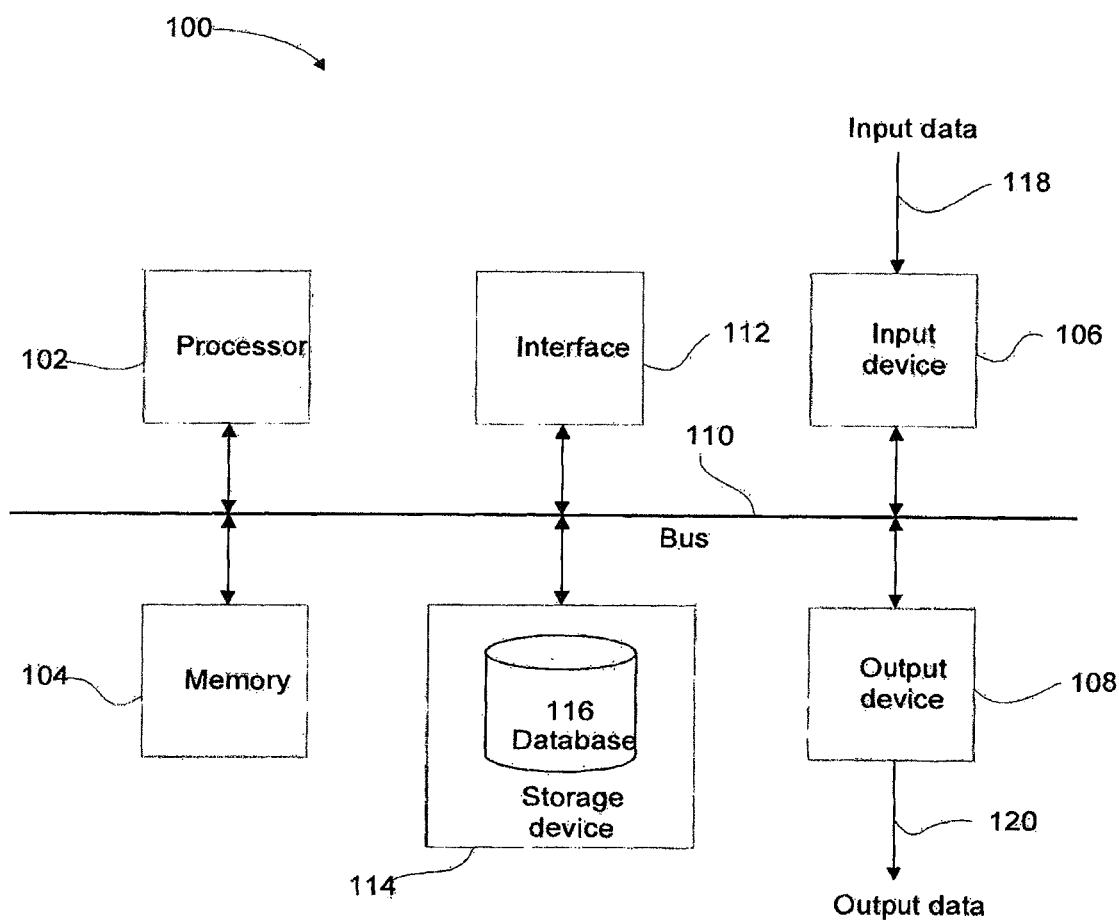
FIG. 1 illustrates a functional block diagram of an example processing device that can be utilised to embody or give effect to a particular embodiment.

A particular embodiment of the present invention can be realised using a processing device, an example of which is shown in FIG. 1. In particular, the processing device 100 generally includes at least one processor 102, or processing unit or plurality of processors, memory 104, at least one input device 106 and at least one output device 108, coupled together via a bus or group of buses 110. In certain embodiments, input device 106 and output device 108 could be the same device. An interface 112 can also be provided for coupling the processing device 100 to one or more peripheral devices, for example interface 112 could be a PCI card or PC card. At least one storage device 114 which houses at least one database 116 can also be provided. The memory 104 can be any form of memory device, for example, volatile or non-volatile memory, solid state storage-devices, magnetic devices, etc. The processor 102 could include more than one distinct processing device, for example to handle different functions within the processing device 100.

Input device 106 receives input data 118 (such as electronic content data), for example via a network or from a local storage device. Output device 108 produces or generates output data 120 (such as viewable content) and can include, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 could be distinct and derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc.

Examples of electronic data storage devices 114 can include disk storage, optical discs, such as CD, DVD, Blu-ray Disc, flash memory/memory card (e.g., solid state semiconductor memory), MultiMedia Card, USB sticks or keys, flash drives, Secure Digital (SD) cards, microSD cards, miniSD cards, SDHC cards, miniSDSC cards, solid-state drives, and the like.

In use, the processing device 100 is adapted to allow data or information to be stored in and/or retrieved from, via wired or wireless communication means, the at least one database 116. The interface 112 may, allow wired and/or wireless communication between the processing unit 102 and peripheral components that may serve a specialised purpose. The processor 102 receives instructions as input data 118 via input device 106 and can display processed results or other output to a user by utilising output device 108. More than one input device 106 and/or output device 108 can be provided. It should be appreciated that the processing device 100 may be any form of terminal, PC, laptop, notebook, tablet, smart phone, specialised hardware, or the like.

Figure 2:
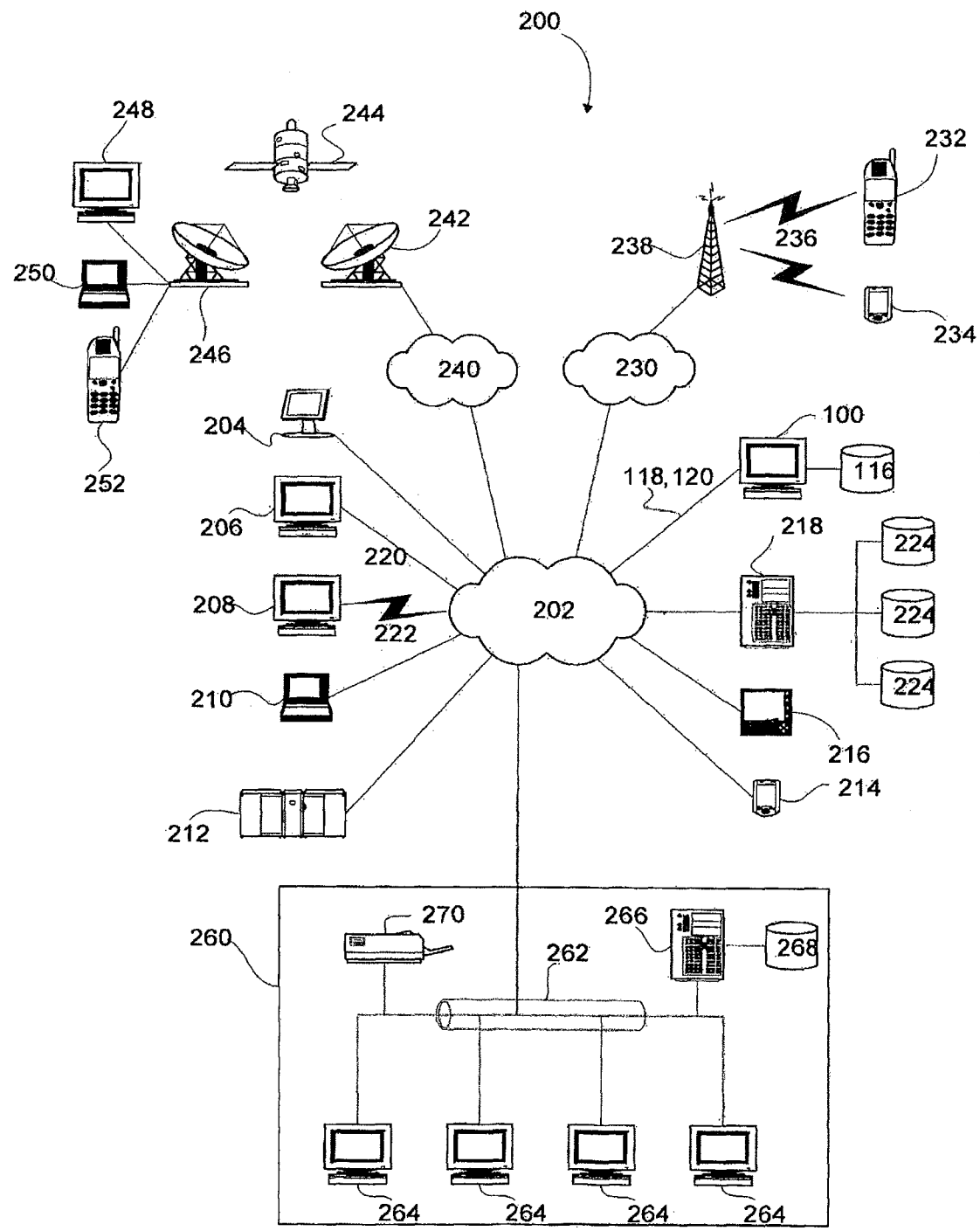
FIG. 2 illustrates an example network infrastructure that can be utilised to embody or give effect to a particular embodiment.

The processing device 100 may be a part of a networked communications system 200, as shown in FIG. 2. Processing device 100 could connect to network 202, for example the Internet or a WAN. Input data 118 and output data 120 could be communicated to other devices via network 202. Other terminals, for example, thin client 204, further processing systems 206 and 208, notebook computer 210, mainframe computer 212, PDA 214, pen-based computer 216, server 218, etc., can be connected to network 202. A large variety of other types of terminals or configurations could be utilised. The transfer of information and/or data over network 202 can be achieved using wired communications means 220 or wireless communications means 222. Server 218 can facilitate the transfer of data between network 202 and one or more databases 224. Server 218 and one or more databases 224 provide an example of an information source.

Other networks may communicate with network 202. For example, telecommunications network 230 could facilitate the transfer of data between network 202 and mobile or cellular telephone 232 or a PDA-type device 234, by utilising wireless communication means 236 and receiving/transmitting station 238. Satellite communications network 240 could communicate with satellite signal receiver 242 which receives data signals from satellite 244 which in turn is in remote communication with satellite signal transmitter 246. Terminals, for example further processing system 248, notebook computer 250 or satellite telephone 252, can thereby communicate with network 202. A local network 260, which for example may be a private network, LAN, etc., may also be connected to network 202. For example, network 202 could be connected with ethernet 262 which connects terminals 264, server 266 which controls the transfer of data to and/or from database 268, and printer 270. Various other types of networks could be utilised.

The processing device 100 is adapted to communicate with other terminals, for example further processing systems 206, 208, by sending and receiving data, 118, 120, to and from the network 202, thereby facilitating possible communication with other components of the networked communications system 200.

Thus, for example, the networks 202, 230, 240 may form part of, or be connected to, the Internet, in which case, the terminals 206, 212, 218, for example, may be web servers, Internet terminals or the like. The networks 202, 230, 240, 260 may be or form part of other communication networks, such as LAN, WAN, ethernet, token ring, FDDI ring, star, etc., networks, or mobile telephone networks, such as GSM, CDMA or 3G, etc., networks, and may be wholly or partially wired, including for example optical fibre, or wireless networks, depending on a particular implementation.

Figure 3:
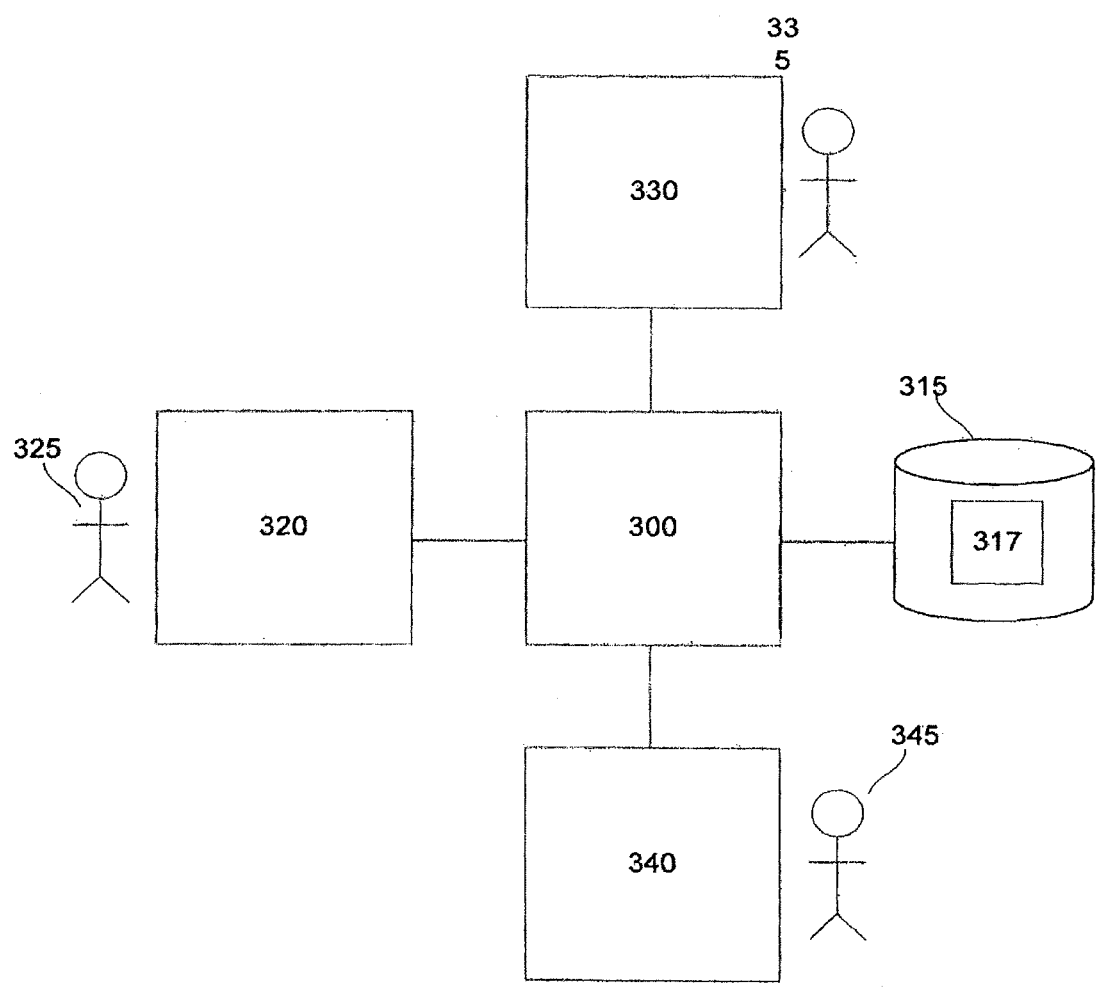
FIG. 3 is a block diagram of an example system for implementing particular embodiments.

Referring to FIG. 3 there is shown a block diagram representing a system 300 for operating an estate registry. In particular, the system 300 includes a server processing system 310 having associated therewith a data store 315 for storing the registry 317 for an individual. The data store 315 is generally provided in the form of a database. The server processing system 310 is in data communication with one or more remote processing systems which provide commands to the server processing system 310. Specifically, the server processing system 310 is in data communication with a user processing system 320 which is operated via the individual 325 and an executor processing system 340 operated by an executor 345. Optionally, the server processing system 310 is in data communication with a third party processing system 330 operated by a third party service provider 335. In a preferable form, the server processing system 310 provides a portal, generally in the form of a website, which is accessible via an internet browser which is operated at each processing system 320, 330, 340.

Figure 4:
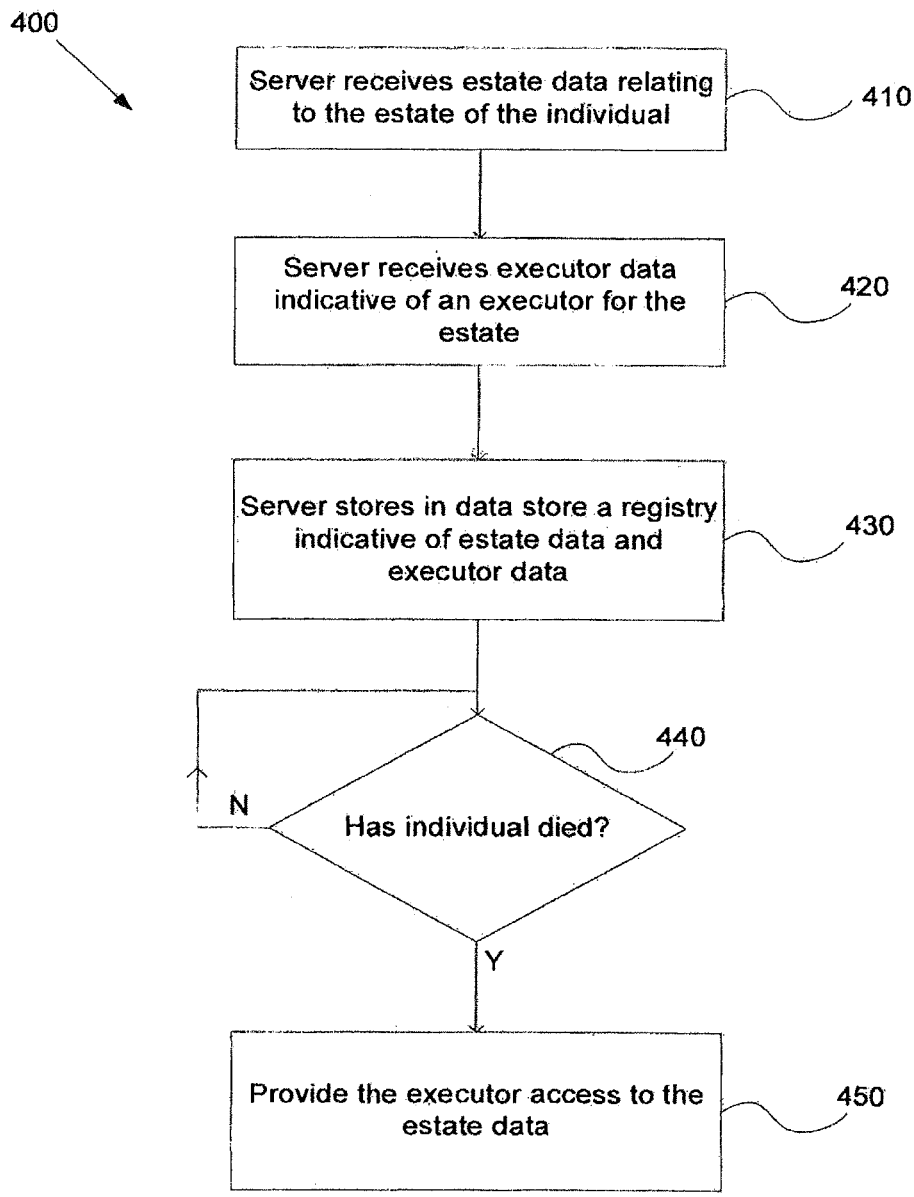
FIG. 4 is a flowchart representing an example of operating the registry.

Referring to FIG. 4 there is shown a flowchart representing an example of operating the registry. In particular, at step 410, the method 400 includes the server processing system 310 receiving, from the user processing system 120 in data communication with the server processing system 310, estate data indicative of estate information relating to the estate of the individual.

At step 420, the method 400 includes the server processing system 310 receiving, from the user processing system 320, executor data indicative of an executor 345 for the estate.

At step 430, the method 400 includes the server processing system 310 storing, in a data store associated with the server processing system 310, a registry 317 for the individual indicative of the estate data and the executor data.

At step 440, the method 400 includes the server processing system 310 determining that the individual has died or suffered a defined trigger event. At step 450, in response to determining that the individual 325 has died or suffered a defined trigger event, the method 400 includes the server processing system 310 providing the executor 345 read-only access to the estate data via an executor processing system 340 in data communication with the server processing system 310.

A defined trigger event may include any event which precludes the individual from managing their own affairs. For example, a defined trigger event may be head trauma, severe degeneration of cognitive functions, coma without prospects for recovery, or the like.

The executor 345 is only provided with read-only access to the estate data. In other words, the executor 345 is not allowed to alter the contents of the estate data using the executor processing system 340.

It will be appreciated that a computer program product can be provided to configure a server processing system 310 to perform the method 400. The computer program product can be provided in the form of a computer readable medium. The term "computer program product" as used herein refers to any storage or transmission medium that participates in providing instructions and/or data to the processing system 100 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the processing system 100. Examples of transmission media include radio or infra-red transmission channels as well as a network connection to another computer or networked device, and the Internet or Intranets including e-mail transmissions and information recorded on Websites and the like.

Figure 5:
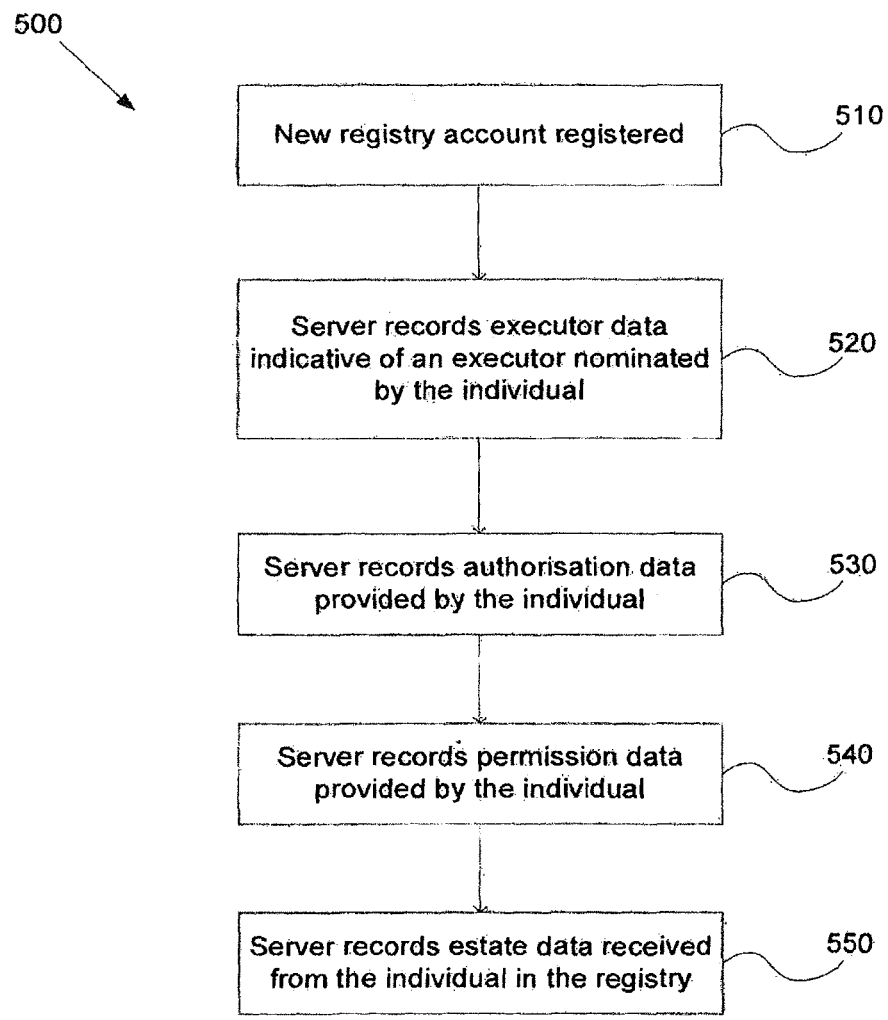
FIG. 5 is a flowchart representing an example of an individual initialising the registry with the server processing system.

Referring to FIG. 5 there is shown a flowchart representing an example of the individual 325 initialising the registry 317 with the server processing system 310.

In particular, at step 510, the method 500 includes an account being registered with the server processing system 310 to generate a registry 317. This step of registering the account can occur in a number of ways.

In a first embodiment, the individual 325 may access a website hosted by the server processing system 310, wherein the individual 325 can register to open an account associated with a registry 317 with the server processing system 310. The individual 325 can provide identity information relating to the individual 325 (i.e. name, address, date of birth, and/or tax file number, etc) which are recorded by the server processing system 310 as a record in the data store 315.

Alternatively, the third party service provider 335, such as a lawyer, accountant or the like, for the individual 325 may register, or at least partially register, an account with the server processing system 310. In the event that an account is only partially registered, the server processing system 310 contacts the individual 325, generally via an email to the individual 325, requesting the individual 325 approve the registration and complete any individual identity information which has not been provided by the third party service provider 335. Upon registering an account, the individual 325 is provided with a username and password combination for secure login with the server processing system 310 to access the registry 317.

The individual 325 or third party service provider 335 may also be provided with an opportunity to define any defined trigger events (i.e. events other than the death of the individual for allowing the executor 345 to access the estate data) at the time the account is registered. For example, this may involve allowing defined trigger events to be selected from a list of available trigger events.

At step 520, the method 500 includes the individual 325 recording executor data indicative of an executor nominated by the individual 325. In one form, the server processing system 310 is configured to present an electronic form requesting particular information regarding the executor 345 such as name, address, email address, contact telephone number, and the like. Upon the individual 325 providing the executor information at the user processing system 320, the server processing system 310 receives and records the executor data indicative of the executor 345 in the database record associated with the registry 317.

At step 530, the method 500 includes the individual 325 recording authorisation data with the server processing system 310. In particular, the authorisation data is indicative of one or more third parties 335 which are authorised by the individual 325 to be able to access at least a portion of the registry 317 on behalf of the individual 325. In one form, the server processing system 310 may present a third party search interface via an internet browser being operated upon the user processing system 320, wherein the individual 325 is able to populate the search interface with search criteria to identify one or more third parties 335 which can be provided access to at least a portion of the registry 317 upon behalf of the individual 325. The server processing system 310 can execute a search of registered accounts based upon the search criteria and present any registered users which match the search criteria in search results which the individual 325 can then select as being an authorised third party. It will be appreciated that a third party service provider 335 may have a registered account with the server processing system 310 yet not have an associated registry 317. Upon selection of a third party 335 from the search results generated by the server processing system 310, authorisation data is recorded in the database record associated with the registry 317, wherein the authorisation data is indicative of the one or more third parties 335 who the individual has indicated as being authorised to access at least a part of the individual's registry 317.

At step 540, the method 500 includes the individual 325 recording permission data with the server processing system 310, wherein the permission data is indicative of permission granted to one or more authorised third parties 335 to access particular portions of the registry 317. In particular, once a third party 335 has been selected as an authorised third party 335, the server processing system 310 prompts the individual 325 with a list of estate categories. In one form, the list of estate categories can be presented in the form of a checklist which the individual 325 can then interact with user processing system 320 to indicate which portions of the registry 317 the selected authorised third party 335 is authorised to have access. In particular, the estate categories may include 'all estate data', 'wills', 'superannuation', 'insurance' or the like. The individual 325 is then able to select the 'all estate data' category or one or more of the other estate categories in order to specify the access permission granted by the individual 325 to the authorised third party 335. The permission data indicative of the estate categories selected by the individual 325 is then recorded in the database record associated with the registry 317 and the authorised third party 335.

At step 550, the method 500 includes the individual 325 storing estate data in the registry 317 stored by the server processing system 310. In particular, the individual 325 may interact with the interface to select an upload command, wherein the server processing system 310 presents to the individual at the user processing system 320 an upload interface. The upload interface allows the individual to select a document accessible by the user processing system 320 for storage in the registry 317. Additionally, the upload interface includes estate category selection interface portion to allow the individual 325 to nominate the estate category for the document being uploaded to the registry 317. Upon the individual 325 approving the upload of the document to the registry 317, the server processing system 310 encrypts the document and stores the encrypted document in the registry 317. Additionally, the server processing system 310 stores estate category data associated with the uploaded document in the database 315 accordingly.

Preferably, as part of the upload process the integrity of the estate data stored in the registry 317 will be protected, for example by time stamping the information and authenticating the user depositing the information into the store.

In one example, the method 500 may include logging access to the server processing system 310, and may include logging any changes to the documents made by the individual.

Figure 6:
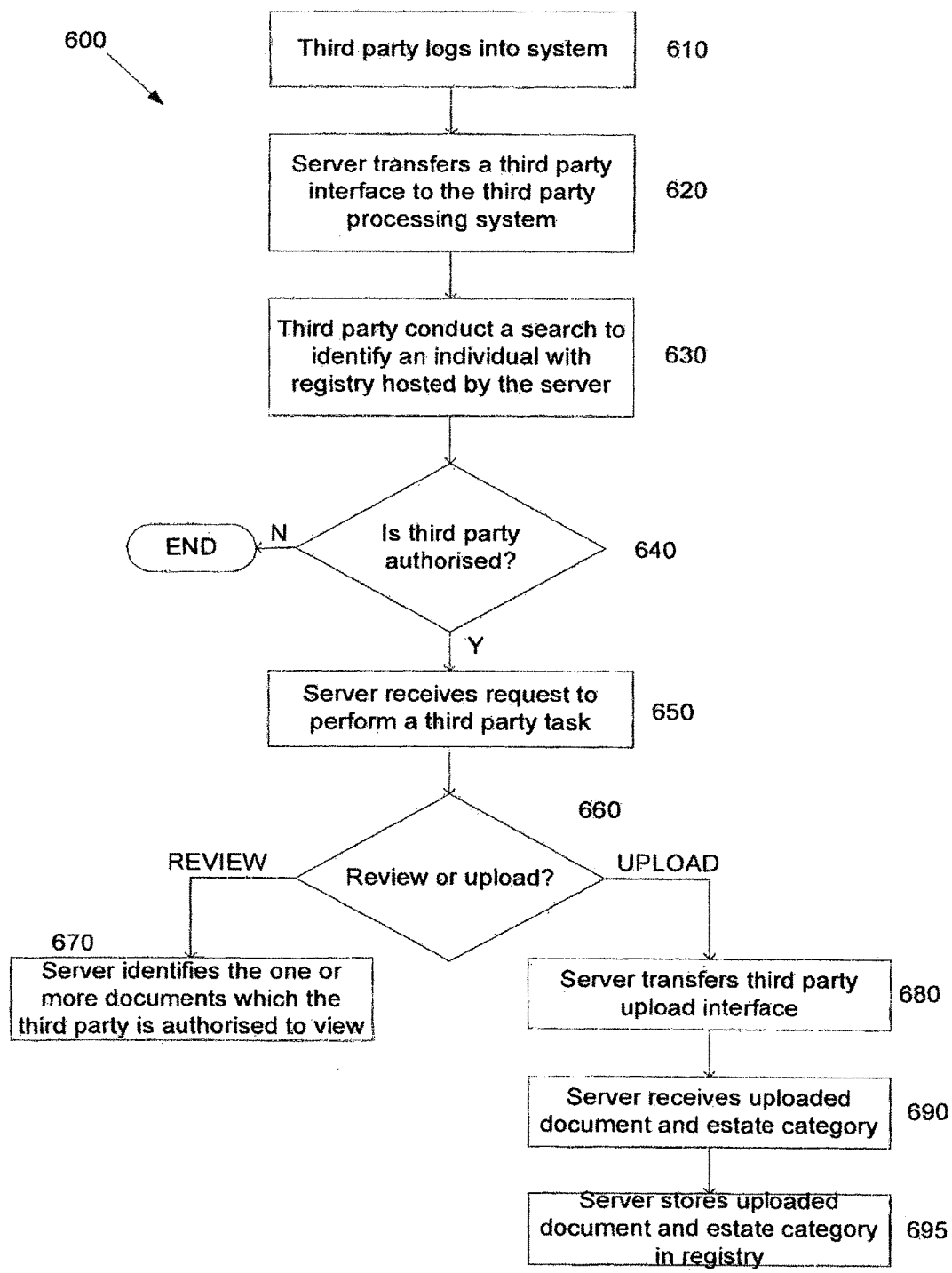
FIG. 6 is a flowchart representing an example of a third party accessing at least a portion with the server processing system.

Referring to FIG. 6 there is shown a flowchart representing an example of the third party service provider 335 obtaining access to at least a portion of the registry 317.

In particular, at step 610, the method 600 includes the third party 335 logging into the system 300. In particular, the third party 335 inputs via an input device at the third party processing system 330 a username and password combination via fields presented in a login webpage presented within an internet browser open upon the third party processing system 330. The username and password combination are transferred to the server processing system 310, generally in an encrypted format, for authentication by the server processing system 310. Upon successful authentication, the method 600 proceeds to step 620, otherwise the method 600 ends due to the third party 335 being unauthorised to use the system 300.

At step 620, the server processing system 310 transfers a third party interface to the third party processing system 330 for presentation to the third party 335 via the internet browser. The third party interface can include a search interface portion which allows the third party 335 to conduct a search for an individual who has a registry 317 managed by the server processing system 310.

At step 630, the method 600 includes the third party 335 conducting a search to identify an individual 325 with an account upon the server processing system 310. In particular, details associated with the individual 325 such as a name, address, date of birth, etc can be populated into a search form, wherein these search criteria are used by the server processing system 310 in an attempt to uniquely identify an individual 325 who has a registry 317 managed by the server processing system 325. Upon identifying a unique record of an individual 325, the method 600 proceeds to step 640, otherwise, if multiple records are identified (e.g. individuals having the same name), then further details regarding the individual 325 may be requested by the server processing system 310.

At step 640, the method includes the server processing system 310 determining if the third party 335 is authorised to access the registry 317 for the requested individual 325. In particular, the server processing system 310 can determine, based upon the authorisation data associated with the individual's registry 317 if the third party 335 is authorised to access the registry 317. In the event that the third party 335 is authorised, the method 600 proceeds to step 650, otherwise the method 600 ends.

At step 650, the method 600 includes the server processing system 310 receiving, from the third party processing system 330, a request to perform a third party task in relation to the individual's registry 317. In the event that the third party task is a request to review the individual's registry 317, the method 600 proceeds to step 660. In the event that the third party task is to upload a document to the third party registry 317, the method 600 proceeds to step 680.

At step 670, the server processing system 310 identifies the one or more documents of the registry 317 for the individual which the third party 335 is authorised to view based upon the permission data associated with the registry 317 for the authorised third party 335. In particular, the third party 335 may be a representative of the company handling the individual's superannuation. In this scenario, the individual 325 may have set the permission data to indicate that this specific third party 335 has permission to access documents having an estate category of 'superannuation'. Upon determining the documents which, the authorised third party 335 can access, the method 600 includes at step 675 the server processing system 310 transferring an indication of the accessible documents is transferred and presented to the third party 335 via the third party processing system 330.

In one example, the permission data is time stamped and a cryptographic hash of the permission data will be maintained.

At step 680, the method 600 includes the server processing system 310 presenting a third party upload interface which enables the third party 335 to indicate a document to be uploaded to the registry 317 and optionally an estate category. In particular, the third party may select a document locally stored on the third party processing system 330 for upload to the registry 317 and additionally indicate an estate category of 'superannuation'. At step 685, the method 600 includes the server processing system 310 receiving the document and the estate category. At step 690, the method 600 includes storing the document and the estate category associated with the newly uploaded document in the registry 317 associated with the individual 325.

In one example, any documents uploaded to the registry 317 will be time stamped and digitally signed to ensure that the documents cannot be changed or altered in a manner that could allow fraud. This can help to prevent external parties from repudiating the documents stored in the system.

Figure 7:
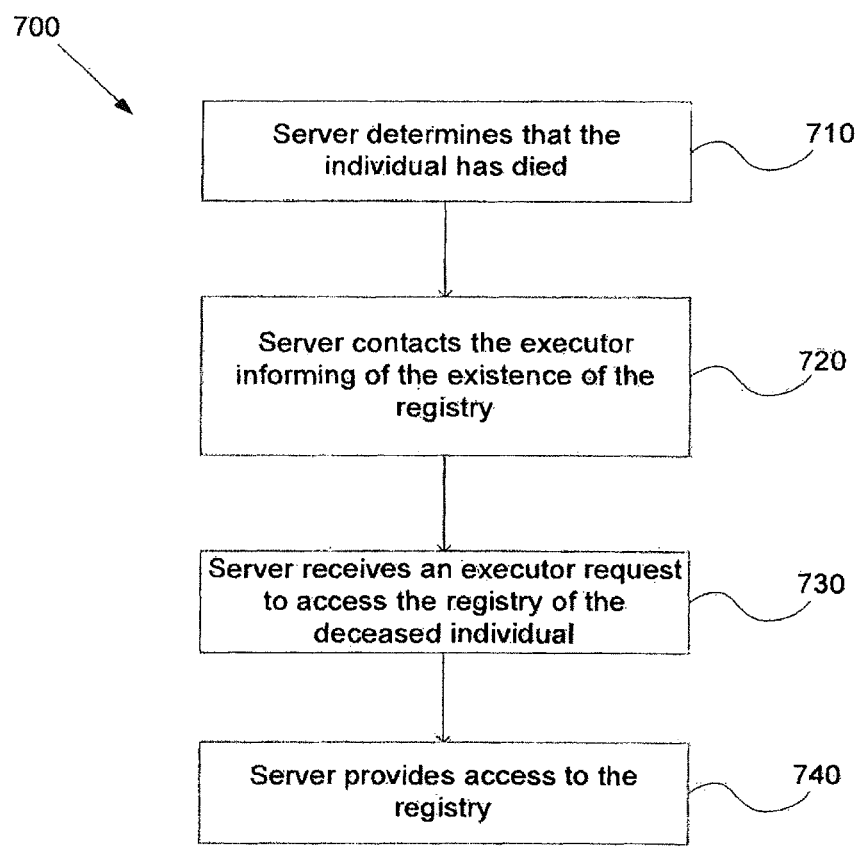
FIG. 7 is a flowchart representing an example of the server processing system notifying the executor upon determining the death of the individual associated with the registry.

Referring to FIG. 7 there is shown a flowchart representing an example of the executor 345 being provided access to the registry 317 upon determining the death of the individual 325.

In particular, at step 710, the method 700 includes the server processing system 320 determining that the individual 325 has died or suffered a defined trigger event. Step 710 can be performed in a number of manners.

In one form, the server processing system 310 may receive a death notification from a death notifying party, such as a relative, friend, the individual's lawyer, or the like. The death notification may be received via a website hosted by the server processing system 310 wherein an indication of the individual 325 that has died may be input via the website.

In another form, the server processing system 310 may receive a death notification from a nominated death notifying party. In particular, the individual 325 may store death notifying party data indicative of a party which by the individual 325 nominates as responsible for notifying the server processing system 320 of the death of the individual 325. In this option, in the event that a death notification is received from another party other than the nominated death notifying party, the server processing system 320 may transfer a request, such as an email, to the nominated death notifying party requesting confirmation that the individual 325 has died.

In an additional or alternate form, the server processing system 320 can be configured to monitor electronic death announcements to determine if the individual has died. In particular, the electronic death announcements can be provided in a plurality of electronically-accessible obituaries such as online newspapers and the like. The server processing system 310 extracts the name of the person who has died from each obituary and determines whether any person had a registry 317 registered with the server processing system 310. In the event of a positive match, the server processing system 310 may transfer an email to the death notifying party nominated by the individual 325 to request confirmation of the death of the individual 325.

It will be appreciated that other events may occur where the individual 325 is precluded from managing their own affairs yet continues living, after which the registry data should nevertheless be released to the executor 345. In general, life events for triggering access to the registry data will be predetermined as defined trigger events, as discussed above. For example, a medical report or court order may be used to confirm that a defined trigger event has been suffered by the individual 325. The server processing system 310 may receive a defined trigger event notification from an authorised notifying party, such as a medical professional or a judge satisfied that the individual is legally mentally incapacitated. In particular embodiments the server processing system 310 may require more than one concurring medical reports before allowing access to the registry data by the executor 345.

At step 720, the method 700 includes the executor 345 being contacted and informed of the existence of the registry 317. In one form, the server processing system 310 retrieves the executor data stored in the database 315 and associated with the registry 317 for the deceased individual 325, wherein the executor data is indicative of a means of contacting the executor 345, such as an email address. In the event that an email address is provided, the server processing system 310 generates an email informing the executor 345 of receiving a death notification for the individual and the existence of the registry 317 which the executor 345 can access for handling the estate of the deceased individual 325. However, it will be appreciated that the server processing system 325 may use other communication means to contact the nominated executor 345 for the estate of the deceased individual 325

At step 730, the method 700 includes the server processing system 310 receiving an executor request from the executor 345 via an executor processing system 340 to access the registry 317 of the deceased individual 325. In particular, the executor 345 may access a website via the executor processing system 340 and hosted by the server processing system 310 which enables the executor 345 to provide identity data to prove the identity of the executor 345. Specifically, the executor 345 may need to provide to the server processing system 310 a number of identity documents to prove the identity of the executor 345.

Upon successful identification of the executor 345 by the server processing system 310, the method 700 includes, as step 740, the server processing system 310 providing access to the registry 317. In one form, the executor 345 may be provided with a username and password which the executor 345 can use to login to the system 300 to access all documents contained in the deceased individual's registry 317. Documents may then be downloaded from the server processing system 310 to the executor processing system 340 for handling the deceased individual's estate.

In one variation, the server processing system 310 may store timestamp data associated with each document uploaded to the registry 317. The server processing system 310 may additionally store one or more rules which when executed utilise the timestamp data to determine if the individual 325, or a third party service provider 335, is required to review or update documents stored in the registry 317. Upon one or more of the rules being satisfied, a reminder notice is generated by the server processing system 310 reminding the individual 325 and/or the third party service provider 335 to review and/or update documents stored within the registry 317 for the individual 325. As the documents are stored in an encrypted format, the server processing system 310 decrypts the one or more documents requested by the executor 345 prior to being transferred to the executor processing system 340.

It will be appreciated that the server processing system 310 can be configured to operate a plurality of registries for a plurality of individuals 325.

It will be appreciated that the documents can be uploaded and downloaded to and from the server processing system 310 in a number of formats, including PDF, JPG or the like.

It will be appreciated that a number of different forms of cryptographic protocols may be used for encrypting and decrypting the estate data transferred between the processing systems of the system 300 as well as storing data in the registry 317. In one particular embodiment, the server processing system 310 utilises 128 bit Secure Sockets Layer (SSL) encryption to ensure secure transfer of data.

It will be appreciated that the estate data may be indicative of a variety of estate information which may be desirable in handling a deceased individual's estate. Accordingly, the above identification of possible estate categories is not exhaustive. For example, in particular embodiments the estate data may be indicative of share information including details of share portfolios held by the individual, deeds to property and the like, business documents such as accounting records, other personal documents, and/or funeral plans, along with the types of estate data already described above.

It will be understood that the described systems and methods for operating an estate registry for an individual, will also be applicable to other forms of registries.

For instance, processes generally equivalent to those exemplified above may be applied to provide a corporate registry, in which case the registry would be stored for an entity, such as a corporation, company or any other legal entity. Accordingly, the entity, or a user that is an authorised representative of the entity, will assume the role of the individual in processes similar to those described above.

A corporate registry will typically be configured to allow a different entity, such as a liquidator, to access entity data indicative of entity information relating to the entity, should a defined trigger event take place. Whilst a trigger event for an individual may be the death of the individual, a generally equivalent trigger event for a corporation may be when the corporation is placed into liquidation.

It will be appreciated that similar processes will apply for determining whether the entity has been placed into liquidation or has otherwise suffered a defined trigger event, and subsequently providing the liquidator read-only access to the entity data once it has been determined that a defined trigger event has taken place.

In any case, it will be understood that a range of trigger events may be defined. In general terms, a defined, trigger event may include any event which might require a party to access the entity data, such as to handle the affairs of the entity. This party may be generally referred to as an "accessing party". Thus, trigger events may include events other than liquidation, and the accessing party will not necessarily need to be a liquidator for all defined trigger events. In some circumstances the accessing party may be the individual, entity or user, although the accessing party will often be a different entity, as in the case of an executor or liquidator.

In view of the above, the above discussed methods of operating an estate registry should be interpreted as broadly applying to different types of registries, such as a corporate registry for storing entity data, or a registry for storing document data in general.

In this regard, references to an "individual" in the example above may be considered to apply to any legal person or entity, a corporation, a company, a family trust, or the like. Estate data indicative of estate information relating to the estate of the individual may be considered to be generally equivalent to entity data indicative of entity information relating to the entity, in the context of corporate registries or other registries for entities, as opposed to an estate registry for an individual as exemplified above.

Entity data may be categorised in a similar manner to estate data, for instance through the use of suitable "data categories" in place of "estate categories". For example, data categories may include 'all entity data', 'superannuation', 'software source code', 'share information', 'contracts', 'research data', 'insurance' or the like.

It will be appreciated that entity data in a corporate registry may be indicative of a variety of entity information, such as information which may be desirable in handling the liquidation of the entity, although other types of information may be desirable following the occurrence of other trigger events. Accordingly, the above identification of possible data categories should not be considered exhaustive. For example, in particular embodiments the entity data may be indicative of share information including details of share portfolios held by the entity, deeds to property and the like, business documents such as accounting records, other documents, and/or software source code, along with the types of entity data already described above.

References to an "executor" may be considered to apply to any accessing party that is to be provided access to data stored in the registry in the event of a defined trigger event occurring. Thus, in the context of a corporate registry, a "liquidator" may be the accessing party in place of the "executor", particularly where liquidation of the entity is taken to be a defined trigger event.

In more general terms, it will be understood that an accessing party may be provided access to document data relating to an entity where a defined trigger event has taken place. For instance, an accessing party may require access to estate data for handling the estate of the deceased user (in the role of an executor), or access to entity data for handling the liquidation of a corporation represented by the user (i.e. in the role of a liquidator), or to undertake any suitable actions for handling the ongoing affairs of the user or entity represented by the user after the defined trigger event has occurred.

Preferably, the document data will be digitally signed and encrypted, such that the document data may only be decrypted by the user, authorised representatives of the entity or the like, or the accessing party to be provided access in the event of a defined trigger event taking place. Suitable digital signature and encryption methods and systems will be outlined in further detail below.

It will also be understood that references in the examples above to data, information or processing systems relating to an executor could similarly apply to information or equipment relating to a liquidator or other accessing party. For instance, a "liquidator processing system" operated by a liquidator, or more generally, an "access processing system" operated by any accessing party, may be considered to perform functionalities generally equivalent to an "executor processing system" as referred to in the examples above. Similarly, "liquidator data" indicative of the liquidator nominated by the entity may be considered in place of "executor data" in the context of a corporate registry.

In view of the above, it will be appreciated that a further embodiment of the present invention may involve a server processing system 310 for operating a corporate registry. In this embodiment, the server processing system 310 is configured to receive, from a user processing system 320 in data communication with the server processing system 310, entity data indicative of entity information relating to the entity data. The server processing system 310 will also receive, from the user processing system 320, liquidator data indicative of the liquidator for the entity. Following this, the server processing system 310 will store, in an associated data store, a registry for the entity indicative of the entity data and the liquidator data. In the event that the entity has been placed into liquidation or suffered a defined trigger event, this will be determined by the server processing system 310, and in response to determining that the entity has been placed into liquidation or suffered a defined trigger event, the server processing system 310 will provide the liquidator read-only access to the entity data via a liquidator processing system (generally equivalent to the executor processing system 340) in data communication with the server processing system 310.

It will be appreciated that the server processing system 310 can be configured to operate a plurality of registries for a plurality of entities each represented by one or more users.

In more general terms, embodiments of the present invention will typically involve a server processing system 310 for operating a registry. The server processing system 310 is configured to receive, from a user processing system 320 in data communication with the server processing system, document data relating to an entity, and to receive, from the user processing system 320, access data indicative of an accessing party to be provided access to the document data if a defined trigger event occurs. The server processing system 310 is further configured to store, in a data store associated with the server processing system 310, a registry for the entity indicative of the document data and the access data. When the server processing system 310 determines that a defined trigger event has occurred, the server processing system will respond by providing the accessing party read-only access to the document data via an access processing system in data communication with the server processing system 310.

Irrespective of the type of registry to be provided, third parties, such as service providers or the like, may also be authorised to access particular document data in the registry, usually under conditions established by the user. Permissions may be used to allow (typically limited) access to certain categories of document data stored in the registry, in a similar manner as discussed above for the estate registry example. For example, a company handling an entity's contracts may be provided permission to read-only access documents having a data category of "contracts".

Notifications in the event that a defined trigger event has occurred may also be handled in a manner similar to the methods described above with regard to death notifications in the estate registry example. For instance, a server processing system 310 for operating a corporate registry may be configured to respond to a notification that the entity has been placed into liquidation which may be received by a notifying party, such as an authorised officer of the entity, the entity's lawyer, or the like. Announcements regarding corporations entering liquidation may also be monitored.

In view of the above discussion, it will be understood that the above described systems and methods may generally apply to registries for a range of document data relating to a range of individuals or entities, such that an accessing party can be provided access to the document data following the determination that any one of a range of defined trigger events have occurred.

It will be appreciated that suitable registries may operate by holding documents in the registry in escrow until access to the documents is to be provided after determining that a defined trigger event has occurred.

Figure 8A:
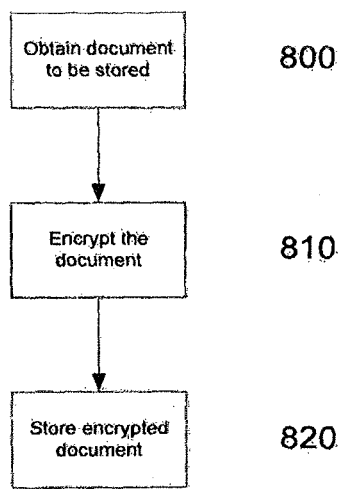
FIG. 8A is a flowchart of an example process for holding a document in escrow on behalf of an individual.

An example process for holding a document in escrow for an individual will now be described with reference to FIG. 8A. In view of the above discussion, it will be appreciated that references to an "individual" in the examples which follow may similarly apply to an entity, or a user representing an entity.

In this example, at step 800 a document to be stored is obtained, together with a digital signature of the individual. The digital signature is at least partially indicative of content of the document and an identity of the individual and can be used to subsequently validate an identity of the individual, thereby allowing third parties to confirm that the document was indeed submitted by the individual, as will be described in more detail below.

The nature of the digital signature may vary depending on the preferred implementation, but in one example is created by encrypting information, such as part of the document, using a secret key of a public/private key pair. This allows third parties to decrypt the signature using the associated public key, and thereby recreate the information so as to validate the individual's identity and that they signed the document, as will be appreciated by persons skilled in the art.

The document and signature may be obtained utilising any suitable technique, but in one example this involves having an individual submit the document and signature to a server processing system 310, for example using a web form or the like. This is typically performed using a user processing system 320 in communication with the server processing system 310 via a communications network, as previously described. Typically, any communication with the server processing system 310 is performed in a secure manner, for example utilising an SSL (Single Socket Layer) connection or similar.

At step 810 the server processing system 310 operates to encrypt the document. The document is typically encrypted so as to allow the document to be decrypted using an appropriate decryption key. This can be achieved utilising any suitable encryption technique, and in one example utilises a symmetric encryption algorithm so that the encryption key and decryption key are the same. The decryption key is defined by at least three key fragments, each of which is associated with a respective entity. The key fragments are typically formed from different portions of the decryption key so that the decryption key can be constructed using any two of the key fragments, thereby allowing the document to be decrypted and released from escrow using the key fragments of any two of the entities. The key fragments may be stored in a database together with an indication of an identity of the respective entity with which they are associated, or may alternatively be supplied to the entities utilising any appropriate technique, depending on the preferred implementation.

In this regard, the entities can include the individual submitting the document and any other two entities. This can include an intended ultimate recipient of the document, government agencies, representatives of the individual, such as lawyers, accountants, or other professionals, other individuals such as friend or family nominated by the individual, as well as an operator of the server processing system 310.

By utilising three key fragments as described above, this allows any two of the entities to subsequently approve release of the document from escrow. This is particularly beneficial as it allows the document to be decrypted when certain conditions are met, with or without approval by the individual. This allows documents to be retained in a secure manner and released as required, for example upon death of the individual, by allowing the other two entities nominated by the individual to approve release and decryption of the document.

At step 820, the encrypted document is stored by the server processing system 310. In this regard, it should be noted that the document is stored in a manner which prevents the document being altered following submission, for example by storing the document in a write-only format so that changes cannot be made to the document once it is submitted. This allows the document to be held in escrow in an unalterable manner so that integrity of the document can be preserved, as will be appreciated by persons skilled in the art.

Figure 8B:
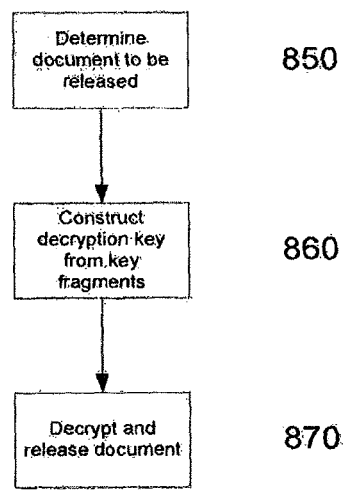
FIG. 8B is a flowchart of an example process for releasing a document from escrow.

An example of the process for releasing the document will now be described with reference to FIG. 8B.

In this example, at step 850 the server processing system 310 determines the document is to be released. This may be achieved in any one of a number of manners and can be performed in response to a request by the individual, or by one or more of the other entities. Additionally and/or alternatively, this may occur in response to certain trigger events, which may be defined by the individual or another one of the entities and approved by the individual. The nature of events will vary depending on the intended utilisation of the system but can include, for example, death of the individual.

At step 860, the server processing system 310 constructs the decryption key from the key fragments. In order to achieve this, the server processing system 310 will typically contact at least two of the entities and seek approval for release of the document, indicating any associated trigger events where necessary. As part of this process, identities of the individuals may need to be validated as will be described in more detail below. Assuming the entities approve release, the respective key fragments of the respective entities are used to reconstruct the decryption key. This can be achieved in any suitable manner depending on where the key fragments are stored. Thus, this may include retrieving the key fragments from the database, or receiving these from the entities, as required.

At step 870, the server processing system 310 decrypts the document and releases the document to the entities that provided approval and/or releases the document in another way in accordance with approved permissions.

Accordingly, it will be appreciated that the above-described process provides a mechanism for holding a document in escrow on behalf of an individual. The document is encrypted so that it can only be decrypted and viewed utilising an appropriate decryption key. The key itself is split into key fragments, any two of which can be utilised to reconstruct the decryption key, thereby allowing two of the entities to provide approval for release of the document, meaning that this can be performed without the individual's input necessarily being required. It will be appreciated that this therefore allows the document to be held in escrow until certain release conditions are met, at which point the document may be provided without the individual's approval.

Figure 9A:
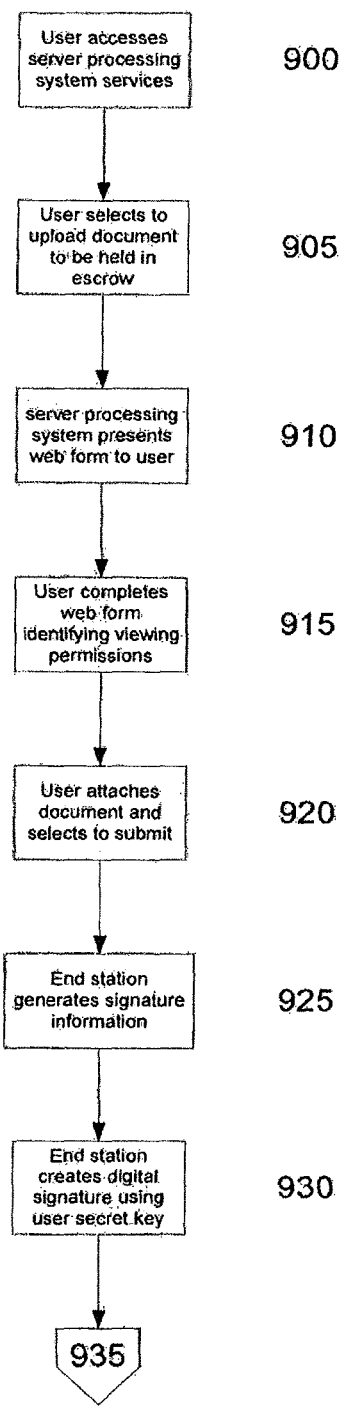
FIGS. 9A to 9C are a flowchart of a specific example of a process for holding a document in escrow on behalf of an individual.
Figure 9B:
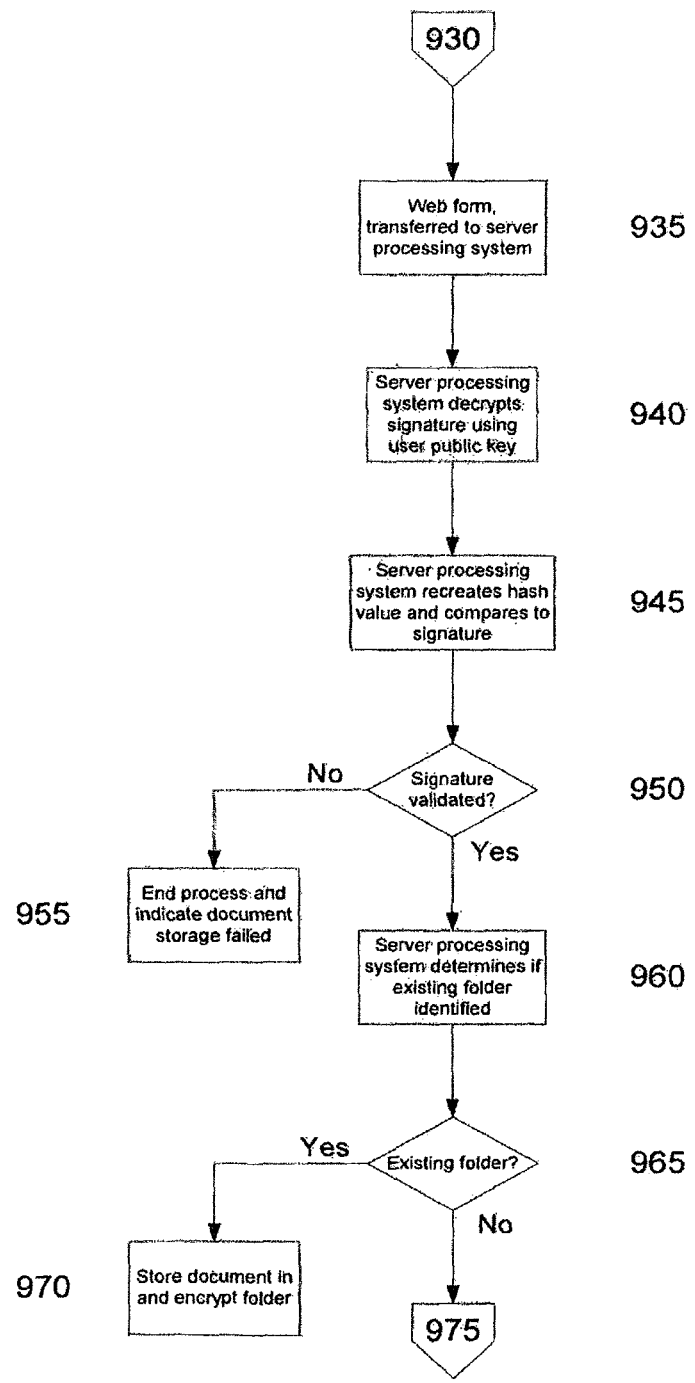
Figure 9C:
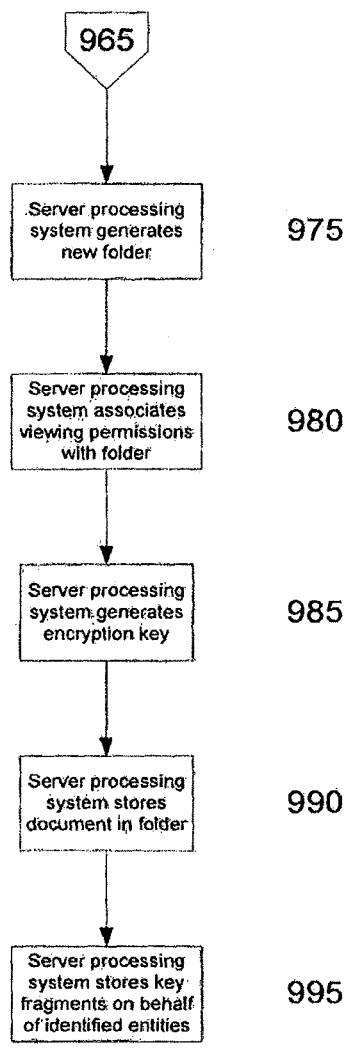

An example of the process for holding a document in escrow on behalf of the individual will now be described in more detail with reference to FIGS. 9A to 9C.

In this example, at step 900 an individual accesses services provided by the server processing system 310, for example, using the user processing system 320 and accessing webpages hosted by the server processing system 310. At step 905, the individual selects to upload a document to be held in escrow. This is typically achieved by having the individual select an appropriate option presented via the webpage, although any suitable technique can be used.

At step 910, the server processing system 310 presents a web form to the individual, allowing the user to attach the document, a digital signature and any other relevant information. In this regard, the web form details any information to be associated with the document, including details of a folder into which the document should be stored, any viewing permissions associated with the document, conditions associated with release of the document, such as details of trigger events, entities authorised to approve release of the document or the like.

In one example, where a folder is used for storing the document, the folder can be a newly defined folder or alternatively can be an existing folder which has been previously defined. In the event that an existing folder is used, the existing folder may contain viewing privileges and these can be inherited by documents contained therein. Typically, in this instance, when the individual selects an existing folder in which to store the document, details of the viewing permissions and other associated information for the folder will be used to automatically populate the web form. Otherwise, at step 915, the individual completes the web form identifying relevant viewing permissions or the like.

At step 920, the individual attaches the document to the form and selects to submit the document. At step 925, the user processing system 320 generates signature information, which is used in generating a digital signature. The signature information is typically predetermined information that can be reconstructed at a later date, and in one example includes a document hash value determined by applying a predetermined hash algorithm to the document to generate a value unique to the particular document, as will be appreciated by persons skilled in the art. The information may also include information such as a time stamp, indicating when the document was prepared, a date of creation of the document, a date of creation of the digital signature, a date of creation of the digital document or a date of receipt of the document, as well as an identity of the individual, or any other predetermined information.

At step 930, the user processing system 320 creates a digital signature using a secret key of the individual and the signature information. In this regard, the secret key of the individual is typically part of a public/private key pair, with the secret key being unique to the individual and the public key being available to the public. In this instance, the digital signature is created utilising the signature information, including the hash value. The public key associated with the individual's secret key can subsequently be used to decrypt the digital signature, and if this is of the correct form, and includes the relevant information, this confirms that the digital signature was created by the individual's secret key and hence is legitimately created by the individual. Accordingly, this can be used to subsequently authenticate the validity of the document.

It will be appreciated that the individual's secret key may be any form of secret key and can be determined in any appropriate manner, for example using the existing PKI (Public Key Infrastructure), which is a combination of software, encryption technologies, and services that enables enterprises to protect the security of their communications and business transactions on the Internet. PKIs integrate digital certificates, public-key cryptography, and certificate authorities into a shared network security architecture, and allow for issuance of digital certificates to individual users, end-user enrolment software, integration with corporate certificate directories, and tools for managing, renewing, and revoking certificates. Accordingly, in one example, this is achieved by obtaining the secret key from a certificate authority which operates to issue digital certificates including secret keys. This can be achieved utilising known techniques allowing a digital certificate containing the secret key stored on the user processing system 320, with this then being used by the user processing system 320 as required to generate the digital signature.

At step 935, the web form, and hence the document and signature are transferred to the server processing system 310. At step 940, the server processing system 310 decrypts the signature utilising the individual's public key. The server processing system 310 then recreates the hash value by applying the hashing algorithm to the document, and compares this to the hash value determined from the digital signature to confirm that these match at step 945. At step 950, if it is determined that the signature is not valid, the process moves on to step 955, in which case the process ends and an indication that document storage has failed may also be optionally issued.

Otherwise, at step 960, the server processing system determines if an existing folder has been identified on the web form. At step 0265, if it is determined that an existing folder is identified, the document is stored in the folder and encrypted utilising the encryption key associated with the folder at step 970.

Otherwise, at step 975, the processing system generates a new folder and associates viewing permissions with the folder at step 980. The processing system then generates an encryption key at step 985 and stores the document in the folder in an encrypted fashion at step 990. In one example, the server processing system encrypts all communication with the database using a suitable encryption technique, such as AES, RSA RC4 (40-, 56-, 128-, 256-bit keys), DES (40-, 56-bit) and 3DES (2- and 3-key) encryption. The system may also check data integrity with checksums, for example using MD5, SHA-1, or the like to automatically detect modifications, replays, missing packets or the like.

As part of this process, the server processing system 310 can generate a notification of receipt of the document and provide an indication of the notification to the individual, allowing the individual to confirm that the document has been successfully held in escrow, and provide confirmation of this to other individuals, such as the other entities, as required.

Following this, at step 995, the server processing system stores key fragments on behalf of identified entities specified in the viewing permissions, although alternatively, key fragments may be provided to the entities, depending on the preferred implementation. Assuming the keys are stored in the database, the keys are associated with the relevant entities, so that the keys can only be retrieved by the server processing system 310 upon successful validation of the identity of the entity. Thus, the server processing system constructs the key fragments from the decryption key associated with the encryption key and then associates these with respective entities identified by the individual. The entities typically include the individual and at least two other entities that can provide permission for the document to be released. In the event that the server processing system does not have these other entities as registered individuals of the system, it is typical for the server processing system to request a digital signature from the entities so that this can be used to subsequently prove the identity of the entities.

Figure 10A:
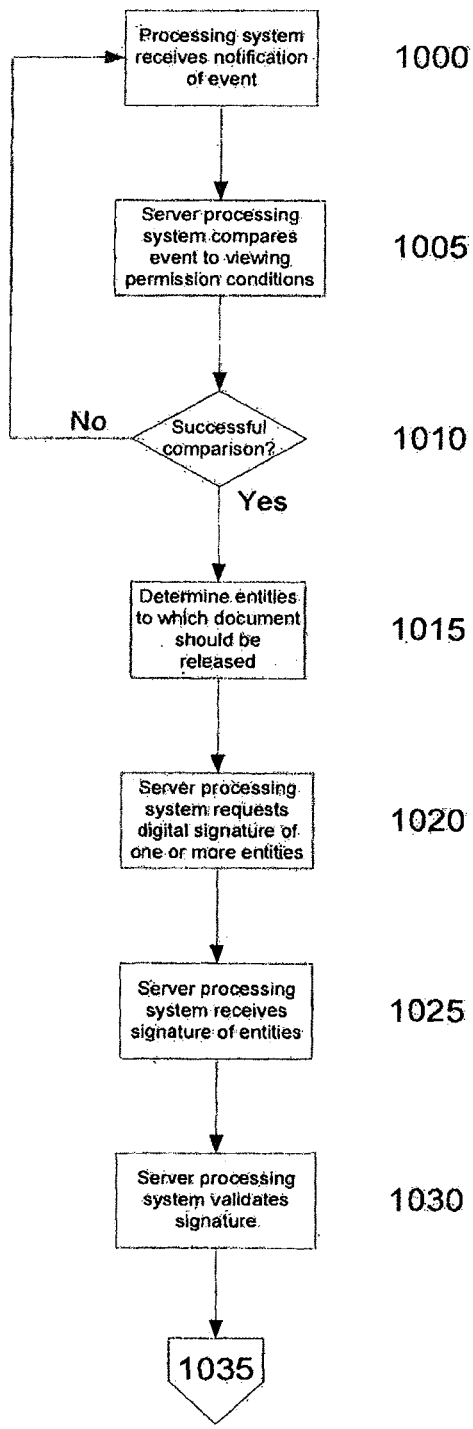
FIGS. 10A and 10B are a flowchart of a specific example of a process for releasing a document from escrow.
Figure 10B:
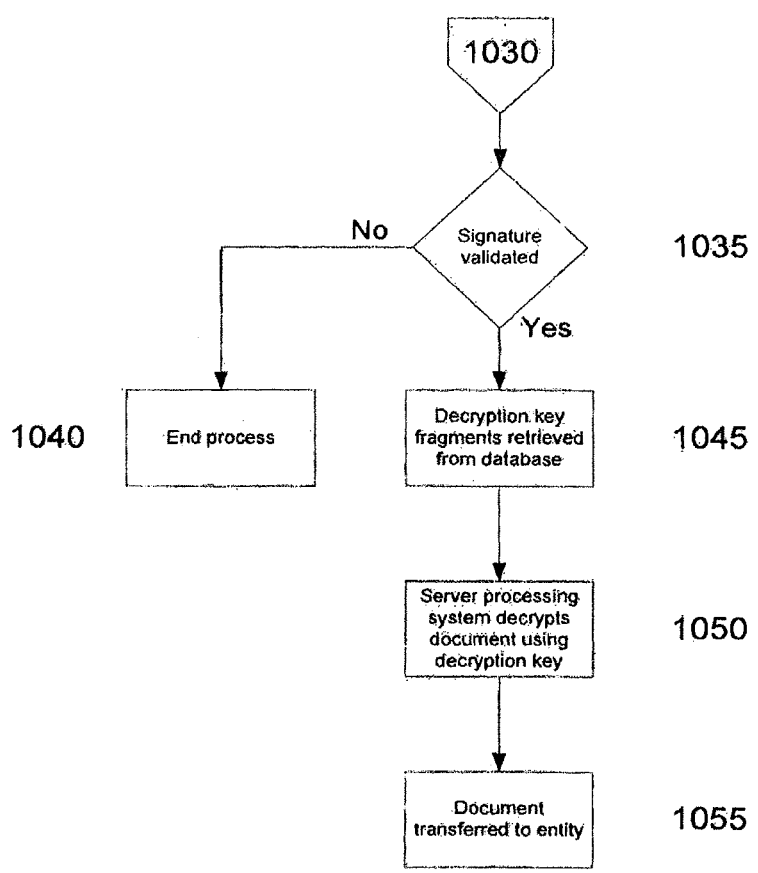

An example process for releasing a document from escrow will now be described with reference to FIGS. 100A and 10B.

In this example, at step 1000, the server processing system 310 receives a notification of an event. The manner in which this is achieved will vary depending upon the preferred implementation and the nature of the events. For example, the server processing system 310 can be adapted to receive requests for release of the document, for example from a user end station 320. Additionally, and/or alternatively, the server processing system 310 can operate to monitor sources of information to automatically detect trigger events. This can include, for example, monitoring notices of deaths to identify when an individual has passed on and hence that documents associated with the individual's will should be released.

At step 1005, the server processing system 310 compares the event to viewing permission conditions associated with the folder containing the document. At step 1010, the server processing system 310 determines if the comparison has been successful and if not returns to step 1000 to allow further events to be analysed.

If the comparison was successful, then at step 1015, the server processing system 310 determines entities to which the document should be released. This information is typically specified in the viewing permissions, which include details of the entities permitted to approve release of the document. The identity of the entities may also be dependent on the nature of the event, so for example, a different entity may be specified for death as opposed to incapacity of the individual, as will be appreciated by persons skilled in the art.

At step 1020, the server processing system 310 requests digital signatures from one or more of the entities, the digital signatures being generated using specified information, which may be predetermined, or generated by the server processing system 310, depending on the preferred implementation. In practice, this step will typically involve obtaining digital certificates from at least two entities, although in one example, at least one of the entities is represented by the server processing system 310 in which case the identity of that entity does not need to be validated.

At step 1025, the server processing system receives the signature of any relevant entities and then operates to validate the signature at 1030. This will typically involve decrypting the signature utilising a public key in a manner similar to that described above with respect to the individual. At step 1035, the server processing system 310 determines if the signature has been validated, and if not, the process ends at step 1040 with a notification being generated that the document will not be released.

Otherwise, at step 1045, assuming an identity of at least one of the two entities has been successfully validated using a digital signature of the entity, the document can be released. To achieve this, the server processing system 310 retrieves decryption fragments from the database with these being used to construct the decryption key and decrypt the document at step 1050. The document can then be transferred to the entities that provided permission for release of the document at step 1055, thereby releasing the document from escrow.

Typically all key recovery procedures are audited, with audit logs being used to capture at least what keys were recovered, who was involved in the process, and the time and date. This allows tracking of access to be performed and can assist in identifying individuals involved in attempts to fraudulently access documents.

It will be appreciated from the above description, that the system effectively holds the decryption key in escrow so that the server processing system 310 can decrypt and read sensitive information when required. When a key is to be recovered, at least two people must undergo authentication to before the key recovery procedure is performed, thereby ensuring that there is a separation of duties, and to prevent any one entity being able to incorrectly authorize release of the document.

The above described system can therefore be used to provide a secure document escrow system, and through appropriate configuration can be adapted to allow documents to be released as required, whilst preventing the documents being altered to maintain their integrity.

In one example, individuals can save documents in a number of folders, with the folders having separate permissions, allowing the folders to be used for different purposes. For example, a folder that cannot be deleted or changed by the user can be used for securely storing important information, such as tax returns, associated receipts or the like. However, other folder configurations can be used. For example, shared document folders can be provided allowing multiple parties to sign and maintain a document (such as a contract), with all changes being recorded and noted.

Any documents stored can be time-stamped, ensuring that a permanent record is maintained as to the content of the document at the specified date, and in one example, folders and documents can be read only to thereby prevent the documents being subsequently altered after submission.

An additional feature of the above process is that as the digital signature of the individual can be checked by any third party, for example by allowing them to decrypt the signature using the individual's public key, this allows a third party to verify the integrity of the document without having to see the content of the document itself. This allows individuals to store documents within folders, and then have the documents witnessed by other entities at remote locations and without having the witness observe the content of the document, instead merely witnessing that the document must have been created by the individual by virtue of the secret key.

Using the system, the document is encapsulated in the database with a timestamp and the digital signature value of the user (computed cryptographically). This also allows for witnessing from untrusted parties, by having them validate the signing of a document and to ensure that a document remains unchanged. Thus, third parties can incorporate their signatures into the database and validate the document and test if any changes have occurred to the document without having any knowledge of the data contained within the document.

Furthermore, the system can recover the plaintext of users files based on a variety of triggers (such as the user's death in an estate registry or if an individual is suspected of criminal activity and a warrant is issued from an authorised state authority) without recovering the user's private key itself.

Examples of further preferred features for providing an escrow document storage and secure signing registry, in the context of the above discussed examples, will now be described.

As discussed above, operation of a registry may broadly involve a server processing system receiving, from a user (i.e. an individual or an authorised representative of a corporation), document data that is to be securely stored and maintained by the server processing system for an entity.

This document data may preferably be encrypted in a manner such that escrowed encryption keys cane be used to access the document data in the event that an accessing party is to access the document data without the user's signing and encryption key (for example, for access from the executor of an estate for an individual or a liquidator for a corporation).

Furthermore, the method will preferably allow for the decryption of document data on a set of defined trigger events. For instance, defined trigger events may be based on the commonly held properties of a secure escrow system.

In one example, the document data is stored in a time stamped and digitally signed format to prove the integrity of the document data in a manner that cannot be altered. The document data will be able to be signed by other external parties whom can validate the authenticity of the document data without having read its contents. The digital signature attached to the document may be maintained with a system signature in a database (following the timestamp).

Preferred properties of suitable systems for implementing the above discussed methods will now be outlined.

A first preferred property is that each user in the system should have sufficient control over his or her secret key to be sure that the key is chosen securely. The user maintains a secret key that they control. This key may be stored in a number of formats (less to more secure):

- The encryption key may be stored in a database run by the registry. This is encrypted using a 256 bit AES key and the encrypted encryption key is maintained to be decrypted by the user who can then load this into a temporary memory cache to encrypt their data;
- The user may use a secure store on a USB or other semi-offline device to store their keys; or,
- The user may have a smart card containing their cryptographic keys.

A second preferred property is that a central authority should ensure that the secret key for each user is chosen securely, even if the user doesn't have access to a good random number generator or if the user fails to use the random number generator properly. The password/passphrases they choose are analysed and the user is not allowed to select a poor passphrase that could be easily cracked.

A third preferred property is that each user should be guaranteed that his or her secret key will remain secret unless a sufficient number of users (for that entity) release their shares of the key to the central authority. Once the central authority releases this detail, the data maintained by them cannot be used to remove or alter the signed document. All document versions are maintained in a database (even if the original document is removed).

A fourth preferred property is that the central authority should assure the users that it can only obtain the secret key for a user who is suspected of using his or her escrowed public key for encryption in the context of illegal activities or when a trigger event occurs by retrieving shares of the key from a certain number of users.

A fifth preferred property is that the central authority should ensure that the escrow system will not be abused by criminals in a way that helps them to communicate without fear of court-authorized wiretapping. More precisely, if two criminals abuse the system by using the information contained in their public keys to communicate using any published public-key encryption algorithm, and the central authority is provided knowledge of the criminals' escrowed secret keys by the trustees, then one of the following two cases should hold:

- It should as easy (at least on a probabilistic basis) for the central authority to decrypt the message traffic between the criminals as it is for the criminals themselves to decrypt that traffic; or
- The criminals already had a way to communicate that could not be decrypted by the government.

In one embodiment, the system may be implemented using a secure escrowed document store that allows documents to be recovered but not to be altered.

For instance, the store may be configured such that an entity (i.e. an individual or an authorised representative of a corporation) can save files in a number of folders. These folders can be set with separate permissions.

In one example, an entity can create a set of folders including:

1. A folder that cannot be deleted or changed by the entity (e.g. this may be used to store tax records and receipts). This folder may be a store for data that must be maintained, and cannot be changed. Files are time-stamped and maintained. The integrity of all files in this folder can be proved without having been seen by any other individual. The signing process is secret.

2. A folder that can be altered, but only if a new version of a document is placed into the folder. This could be used as a registry file holder. Users could create documents (such as a will), sign these and have the documents witnessed without having them read.

3. A shared document folder. Here, multiple parties can sign and maintain a document (such as a contract). All changes will be recorded and noted (including any following the application of a signature). In this case, documents can be selectively escrowed.

In any event, the private encrypting key of the entity is signed and escrowed. The method of escrow is use the private key of the entity and the escrow party (i.e. the operator of the server processing system) to protect the keys.

A database of both signing keys (the user's public signing key for the verification of the document and the public encryption key of the user (such that they can decrypt their own documents at will) may be maintained.

Furthermore, in the case of a corporation or similar entity for which documents may be stored by a plurality of authorised representatives, each authorised representative can maintain multiple key identities with separate signing keys based on their respective roles (individual, company director, Tax authority etc.).

Figure 11:
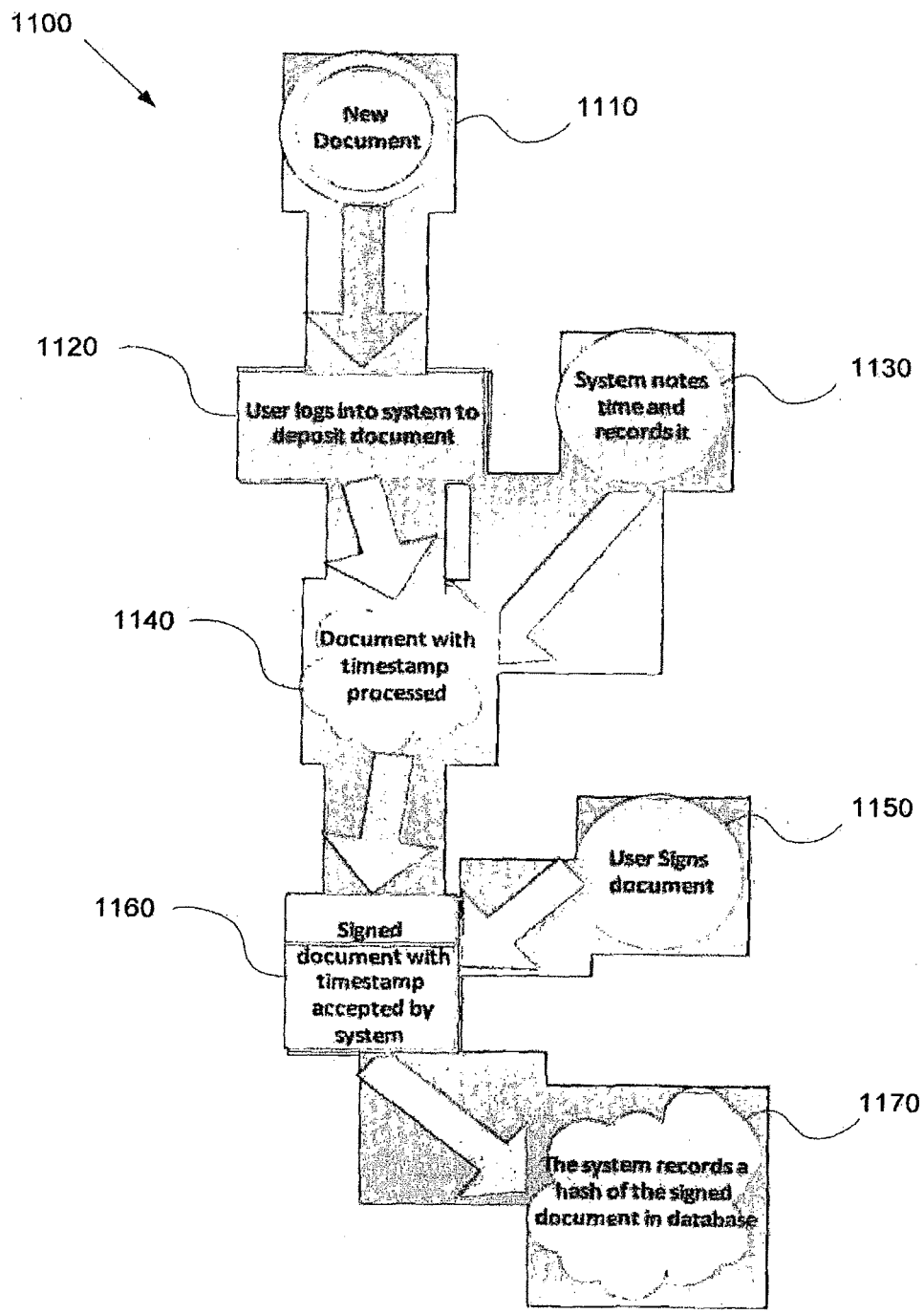
FIG. 11 is a flowchart representing an example of a process for saving document data as a signed document with a timestamp.

An example process for user signing of documents will now be described, with reference to FIG. 11.

At step 1110, a new document is generated, and a user logs into the system at step 1120 to upload the document into the registry. At the same time as the upload is requested, the system notes the time and records it at step 1130. At step 1140, the document is processed with the timestamp determined by the system. The user signs the documents at step 1150, and the signed document with the timestamp is accepted by the system at step 1160. At step 1170, the system will then record a hash of the signed document, in a database or other suitable store.

Figure 12:
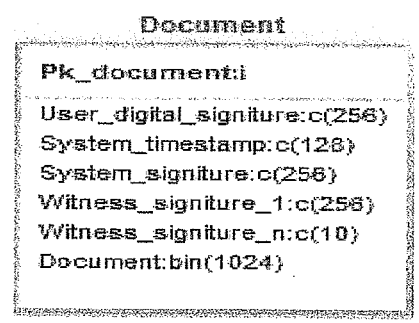
FIG. 12 is an example of database fields for a signed document with a timestamp; and, FIG. 13 is a flowchart representing an example scheme for splitting an encryption key.

In one example, documents uploaded as signed (but not encrypted) may be stored in a database as follows. A field may be recorded for any signatures (hash values) attached to the user and any witnesses, the timestamp of the document, and the document as a binary blob (this can also include the encrypted document). An example of suitable database fields can be seen in FIG. 12.

In preferred example implementations, the system is a recoverable and certifiable cryptosystem. Accordingly, users of the system should be able to generate certifiable keys efficiently. The following is the formal definition of a suitable form of the system.

The system may be a Recoverable Certifiable Cryptosystem based on an 5-tuple (GEN, VER, $REC_1$, $REC_2$, $REC_3$) such that:

1. GEN is a publicly known poly-time probabilistic Turing Machine that takes no input and generates the triple ($K_1$, $K_2$,P) which is left on the tape as output. Here $K_2$ is a randomly generated private key and $K_1$ is the corresponding public key. P is a poly-sized certificate that proves that $K_2$ is recoverable by the escrow system using P.

2. VER is a publicly known poly-time deterministic Turing Machine that takes ($K_1$, P) on its input tape and returns a Boolean value. With very high probability, VER returns true if P can be used to recover the private key $K_2$.

3. $REC_i$, where $1 \leq i \leq m$ is a private poly-time deterministic Turing Machine that takes P as input and returns share i of $K_2$ on its tape as output, assuming that $K_2$ was properly escrowed. The Turing machines $REC_i$ for $1 \leq i \leq m$ can be used collaboratively to recover $K_2$.

4. It is intractable to recover $K_2$ given $K_1$ and P without $REC_1$, $REC_2$, $REC_3$.

An escrow authority (CA) will not publish a public key unless it is verified that the corresponding private key is escrowed properly. Let $EA_i$ denote Escrow Authority i. It is also assumed that $EA_i$ knows only $REC_i$, in addition to what is publicly known. Such a system is therefore used as follows.

To publish a public key, user U runs GEN and receives ($K_1$, $K_2$, and P). U keeps $K_2$ private and encrypts the pair ($K_1$, P) with the public key of the CA. U then sends the resulting cipher text to the CA. The CA decrypts this value, and recovers ($K_1$, P). The CA then computes $VER(K_1,P)$, and publishes $K_1$ in the database of public keys if the result is true.

The certificate P is typically not published.

Where U's public key is accepted and $K_1$ appears in the database of the CA, given P, the Escrow Authorities can recover $K_2$ as follows.

$EA_i$ computes share i of $K_2$ by running $REC_i(P)$. The authorities then pool their shares and recover $K_2$.

Public escrow verification is performed as follows.

VER takes ((y,g,p),P) on its input tape and outputs a Boolean value. VER verifies the following two criteria:

1. $C^{b_i}C_i = z_i^3 \mod(2tn)$ for $1 \leq i \leq N$
2. $v_i = (y^{1-b_i}g^{b_i})^{z_i} \mod p$ for $1 \leq i \leq N$ VER returns true when both criterion are satisfied. Note that sceptical verifiers may also wish to check the parameters supplied by the escrow authorities (e.g., that n is composite, p is prime, etc.).

With regard to key recovery, $REC_i$ recovers share i of the user's private key x as follows. $REC_i$ takes C from P. It then recovers share $s_i$ using the private share $d_i$. It outputs $s_i$ on its tape. The systems then pool their shares and x is computed. Criterion 3 of definition 1 is therefore met.

Suitable forms of the system will preferably allow the recovery of plaintext data. The system may recover the plaintext of user's files based on a variety of triggers (such as the user's death in an estate registry or if an individual is suspected of criminal activity and a warrant is issued from an authorised state authority) without recovering the user's private key itself.

In one example of the system the private decryption exponent is $d = \Sigma_{i=1}^m d_i \mod \phi(tn)$, and d is the inverse of 3 $\mod \phi(tn)$. To decrypt the El Gamal cipher text (a, b) of a user U the escrow system will process the request as follows:

1. Each of the m escrow authorities receives C corresponding to U.
2. Escrow authority 1 computes $s_1 = a^{C^{d_i}} \mod p$
3. Escrow authority i+1 computes $s_{i+1} = s_i^{C^{d_{i+1}}} \mod p$
4. Escrow authority m decrypts (a, b) by computing $b/(s_{m-1}C^{d_m}) \mod p$ In general, no one can, recover x unless an event has triggered the release of the values $C^{d_i}$ from the escrow system.

In view of the above definitions, it will be appreciated that the process of uploading a document (i.e. a user U saves a document in a protected folder) may proceed as follows:

1. U signs a document using their signing key.

2. The system appends a timestamp to the document and signs the document.

3. The document is encrypted by U who uses their escrowed public key to encrypt the document.

Figure 13:
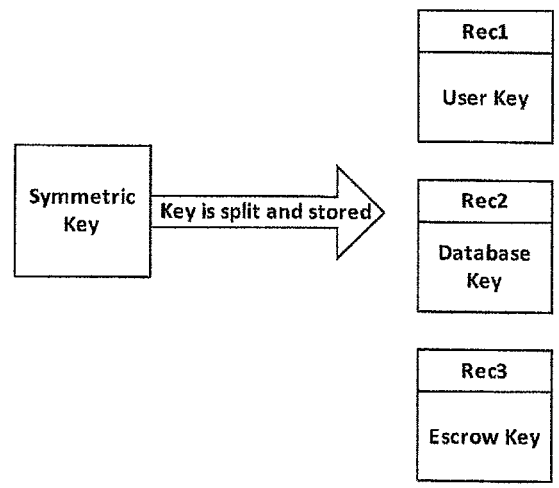

An example scheme for splitting the encryption key is illustrated in FIG. 13. Specifically, a symmetric key used for encrypting an uploaded document may be split and stored in the following parts.

REC1—Stored either in the user system or database encrypted using the users' private key;

REC2—Stored by the system and protected using the system key; and,

REC3—Activated for escrow purposes. REC2 and REC3 can be used in conjunction to decrypt the document but not to alter the signature.

REC1, REC2 and REC3 may hold overlapping sections of the symmetric key with at least two of the three keys being required to decrypt the document.

Suitable forms of the system may be provided as zero knowledge systems whereby a document may be signed without the knowledge of a user. Using the system, the document is encapsulated in the database with a timestamp and the digital signature value of the user U (computed cryptographically). This can allows for witnessing from untrusted parties. These parties can be used to validate the signing of a document and to ensure that a document remains unchanged. They can incorporate their signatures into the database and validate the document and test if any changes have occurred to the document without having any knowledge of the data contained within the document.

As mentioned above, a user's keys may also be stored on a smartcard. More generally, an identification scheme such as that proposed by Leighton and Micali in U.S. Pat. No. 4,879,747 may be implemented on a smartcard, which may be used to maintain the user's identity, keys and other data.

In one example, the system may employ safeguards to protect against compromise or loss of escrowed keys. These can include a combination of technical, procedural, and legal safeguards. Examples of such safeguards include auditing, separation of duties, split knowledge, two-person control, physical security, cryptography, redundancy, computer security, trusted systems, independent testing and validation, certification, accreditation, configuration management, and laws with penalties for misuse.

Suitable forms of the system may operate by checking a range of system triggers. Database triggers are procedural code that is automatically executed in reaction to selected events on a particular table, row or field in a database. The triggers are set to fire when events that are defined in policy occur. Examples of triggers are outlined below.

System triggers allow the activation of controls that start when system events take place. These events can include:

The start-up and shutdown of the database;

Logon and logoff from users;

Privileged access; and

The creation, altering and dropping of schema objects.

Autonomous transactions may allow a log to be written for the above system events. The database security will check what (if any) systems triggers exist and ensure that these are aligned with the policy of the user's store. An example trigger may be sending an alert if a user with administrative access has been added to the database.

Update, delete, and insert triggers may be used. Defence in depth requires an understanding of the users' actions at multiple levels. This is not just access to the database, but access at the detailed row level for selected events and where there is sensitive data. Database triggers will capture changes at the column and row level. All data changes will be recorded. The database will be configured to write entire rows of data detailing a change to the data (who, what, where and why). This can be done both ahead of and subsequent to the modification of data being made with a write of information to a log table in the database and to an alternate location.

Fine-grained audit and review may be based on internal triggers that react when selected SQL code is parsed. This approach allows a reviewer to perform access reviews to the row and column level—not only for changes—but as well for read statements.

For instance, the user may be able to check out who has access the database (and even what tables, rows and fields that they have access to) and files they maintain. Checking access requires that the audit verify access location and time (where and when). Logon failures should also be checked with seemingly legitimate access at out of the ordinary or anomalous times (such as access to a local payroll system at 3 am on a Sunday morning).

Changes to the database structure may also be audited. In general, production databases should never allow any user to alter the schema structure. Changes should only be done (such as for upgrades) at definite times (that are logged and approved through change control). All other changes should be regarded as suspicious. Any privileges allowing this must be reviewed carefully. An examination of the database logs for evidence of structural changes can uncover evidence of invalid or unauthorized use of the database.

Any use of system privileges may also be monitored. It is one thing to check the configuration of a database; it is another all together to validate that access has been the same as a configuration file over time, or indeed if the database is reacting as it should. Logging to a separate—system is critical for this reason. If the DBA and system administration function lie with the same person, it is possible to remove evidence of changes to the system. Separate logs provide the capacity to check if either an attacker or a rogue DBA has made any authorized changes to the database.

Data changes to objects may be logged and recorded. The requirements in this regard may be very application and installation specific. This is where the security tester needs to know what they are doing and why. This type of review needs to be purposeful and objective. It is easy to exceed the scope of an object access audit and in this event it is also possible for the tester to breach the law themselves (for instance in gaining an unauthorized view of health information).

For instance, failed log-on attempts can also be monitored: This may involve checking for attempts to gain unauthorized access the database (generally it should be ensured that logs are available).

Attempts to access the database with non-existent users can be monitored. This could indicate an attempt to bypass the controls in place over the system.

Checks may be performed for users sharing database accounts. Non-repudiation hinges on not sharing accounts and access. Shared accounts are the anathema of a secure system and there is no compliance regime that allows this practice. Checks will disable shared access to the system requiring a reset of the account.

Multiple access attempts for different users from the same terminal can indicate compromised access or shared access, and thus the system may also be used to check if multiple database accounts have been used from the same terminal.

It will be appreciated that the above described methods and systems may be used to provide a registry suitable for escrow document storage and secure signing. Preferred encryption and security techniques have been disclosed to ensure that access to document data is restricted to either users directly associated with the entity (i.e. an individual where the entity is an individual, or an authorised representative where the entity is a corporate entity or the like).

Optional embodiments of the present invention may also be said to broadly, consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although a preferred embodiment has been described in detail, it should be understood that many modifications, changes, substitutions or alterations will be apparent to those skilled in the art without departing from the scope of the present invention.

The invention claimed is:

1. A server processing system for operating a registry, wherein the registry is an estate registry, the server processing system including a memory operable to store at least one program, and a processor communicatively coupled to the memory, wherein the processor is configured to:
receive, from a user processing system in data communication with the server processing system, document data relating to an entity, wherein the entity is an individual and wherein the document data is estate data indicative of estate information relating to the estate of the individual;
receive, from the user processing system, access data indicative of an accessing party to be provided access to the document data if a defined trigger event occurs, wherein a defined trigger event includes the individual dying, and wherein the access data is executor data indicative of an executor for the estate;
obtain, from the user processing system, a digital signature of the individual, the digital signature being indicative of document content of the document data and an identity of the individual;
validate the digital signature of the individual;
before determining that a defined trigger event has occurred, encrypt the document data so that the document data can be decrypted using a decryption key;
store the encrypted document in response to a successful validation;
store, in a data store associated with the server processing system, a registry for the entity indicative of the document data and the access data;
receive, from the user processing system, an indication of an authorized death notifying party;
store, in the data store, the indication of the authorized death notifying party;
monitor electronic death announcements to determine if the individual has died by accessing a plurality of electronic death announcements and, for each electronic death announcement, extracting a name of a person who has died and determining whether the name of the person who has died matches the individual associated with the registry;
in response to determining that the individual has died, transfer a request to the authorized death notifying party, requesting confirmation that the individual has died;

in response to receiving confirmation that the individual has died, determine that a defined trigger event has occurred; and in response to determining that a defined trigger event has occurred, decrypt the document data using the decryption key and provide the accessing party read-only access to the document data via an access processing system in data communication with the server processing system.

2. The server processing system according to claim 1, wherein the server processing system is configured to:
receive, from the user processing system, authorisation data indicative of a third party authorised by the entity to read-only access at least a portion of the registry;
receive, from the third party via a third party processing system, an access request;
determine, based upon the authorisation data, if the third party is authorised to access at least a portion of the registry; and
in response to identifying the third party as being authorised, provide the third party with access to at least a portion of the registry.

3. The server processing system according to claim 2, wherein the server processing system is configured to:
receive permission data indicative of the entity authorising the third party being able to access a portion of the registry;
store the permission data in the data store; and
in response to receiving the access request and upon identifying the third party as being authorised, provide the third party with read-only access to the portion of the registry corresponding to the permission data for the third party.

4. The server processing system according to claim 2, wherein the server processing system is configured to:
maintain read only access to documents stored in the registry;
maintain a secure timestamp of all documents stored in the registry; and,
allow documents stored in the registry to be digitally signed.

5. The server processing system according to claim 2, wherein the access request includes one or more identity fields and the data store has stored therein identity data for the entity associated with the registry, wherein the server processing system is configured to compare the one or more identity fields to the identity data to uniquely identify the registry associated with the entity.

6. The server processing system according to claim 1, wherein the server processing system is configured to:
receive, from a notifying party, a notification indicative that a defined trigger event has occurred; and
in response to receiving the notification, provide the accessing party read-only access to the document data.

7. The server processing system according to claim 1, wherein the server processing system is configured to:
receive, from the entity via the user processing system, an indication of an authorised notifying party;
store, in the data store, the indication of the authorised notifying party;
receive, from a notifying party, an indication that a defined trigger event has occurred;
determine if the notifying party is the authorised notifying party; and
in response to the notifying party corresponding to the authorised notifying party, provide the accessing party read-only access to the document data.

8. The server processing system according to claim 1, wherein the data store has stored therein one or more reminder rules, wherein the server processing system is configured to:
automatically execute the one or more reminder rules to determine if a reminder notice is required to be sent to the entity to remind the entity to review and update the registry; and
in the event of a positive determination, transfer, to the entity, the reminder notice.

9. The server processing system according to claim 1, wherein the decryption key is defined by at least three key fragments, each key fragment being associated with a respective entity and the key fragments being arranged so that the decryption key can be constructed from any two key fragments thereby allowing the document data to be decrypted and accessed using the key fragments of any two of the entities.

10. The server processing system according to claim 9, wherein the server processing system is configured to:
determine the document data is to be accessed;
construct the decryption key from the key fragments associated with at least two of the entities; and,
use the constructed decryption key to decrypt and thereby provide access to the document data.

11. The server processing system according to claim 10, wherein the key fragments are stored in a store together with an indication of an identity of the respective entity, and wherein the server processing system is configured to:
determine at least two entities authorised to access the document data;
retrieve key fragments associated with the at least two entities from the store; and,
provide access to the document data using the key fragments associated with the at least two entities.

12. The server processing system according to claim 1, wherein the digital signature is generated by encrypting information using a private key of a public/private key pair, and wherein the server processing system is configured to:
receive the digital signature, the digital signature being generated by encrypting information using a private key of a public/private key pair; and,
decrypt the digital signature using the public key to thereby validate the identity of at least one of the individual and the entities.

13. A method for operating a registry, wherein the registry is an estate registry, and wherein the method includes, in a server processing system including a memory operable to store at least one program, and a processor communicatively coupled to the memory, the method comprising:
at the processor:
receiving, from a user processing system in data communication with the server processing system, document data relating to an entity, wherein the entity is an individual and wherein the document data is estate data indicative of estate information relating to the estate of the individual;
receiving, from the user processing system, access data indicative of an accessing party to be provided access to the document data if a defined trigger event occurs, wherein a defined trigger event includes the individual dying, and wherein the access data is executor data indicative of an executor for the estate;
obtaining, from the user processing system, a digital signature of the individual, the digital signature being indicative of document content of the document data and an identity of the individual;

validating the digital signature of the individual;

before determining that a defined trigger event has occurred, encrypting the document data so that the document data can be decrypted using a decryption key; storing, in a data store associated with the server processing system, a registry for the entity indicative of the document data and the access data;

storing the encrypted document in response to a successful validation;

receiving, from the user processing system, an indication of an authorised death notifying party;

storing, in the data store, the indication of the authorised death notifying party;

monitoring electronic death announcements to determine if the individual has died by accessing a plurality of electronic death announcements and, for each electronic death announcement, extracting a name of a person who has died and determining whether the name of the person who has died matches the individual associated with the registry;

in response to determining that the individual has died, transferring a request to the authorized death notifying party, requesting confirmation that the individual has died;

in response to receiving confirmation that the individual has died, determining that a defined trigger event has occurred; and in response to determining that a defined trigger event has occurred, decrypting the document data using the decryption key and providing the accessing party read-only access to the document data via an access processing system in data communication with the server processing system.

* * * * *